United States Patent
Suzuki et al.

(10) Patent No.: US 10,428,192 B2
(45) Date of Patent: Oct. 1, 2019

(54) CARBON FIBER REINFORCED MOLDING MATERIAL AND SHAPED PRODUCT

(71) Applicant: Teijin Limited, Osaka-shi, Osaka (JP)

(72) Inventors: Shuhei Suzuki, Osaka (JP); Takaya Fujii, Osaka (JP); Hodaka Yokomizo, Osaka (JP); Hidenori Aoki, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 475 days.

(21) Appl. No.: 14/911,419

(22) PCT Filed: Feb. 6, 2015

(86) PCT No.: PCT/JP2015/053353
§ 371 (c)(1),
(2) Date: Feb. 10, 2016

(87) PCT Pub. No.: WO2015/122366
PCT Pub. Date: Aug. 20, 2015

(65) Prior Publication Data
US 2016/0194461 A1    Jul. 7, 2016

(30) Foreign Application Priority Data

Feb. 14, 2014 (JP) ................. 2014-026968

(51) Int. Cl.
C08J 5/04 (2006.01)
C08K 7/06 (2006.01)
C08L 101/00 (2006.01)

(52) U.S. Cl.
CPC ............ C08J 5/042 (2013.01); C08K 7/06 (2013.01); C08L 101/00 (2013.01);
(Continued)

(58) Field of Classification Search
CPC ...... C08J 5/042; C08K 7/06; C08K 2201/004; C08K 2201/014
See application file for complete search history.

(56) References Cited

U.S. PATENT DOCUMENTS 5,679,456 A * 10/1997 Sakai .................. B29B 9/14
428/340
7,754,323 B2  7/2010 Murai et al.
(Continued)

FOREIGN PATENT DOCUMENTS

JP  H03-261513 A  11/1991
JP  H10-323829 A  12/1998
(Continued)

OTHER PUBLICATIONS

JP2011-157524A translation.*
(Continued)

*Primary Examiner* — Scott R. Walshon
*Assistant Examiner* — Jasper Saberi
(74) *Attorney, Agent, or Firm* — Banner & Witcoff, Ltd.

(57) ABSTRACT

There is provided a plate-shaped carbon fiber reinforced molding material comprising a thermoplastic resin, carbon fibers (A) and carbon fibers (B), wherein:
i) the carbon fibers (A) have fiber lengths ranging from 0.01 mm to less than 3 mm,
ii) the carbon fibers (B) have fiber lengths ranging from 3 mm to less than 100 mm,
iii) $1.0 < Lw_A/Ln_A < 3$ is satisfied where $Lw_A$ and $Ln_A$ are a weight-average fiber length and a number-average fiber length of the carbon fibers (A), respectively, and
iv) the carbon fibers (B) are two-dimensionally randomly oriented.

7 Claims, 8 Drawing Sheets

(52) U.S. Cl.
CPC ..... *C08J 2377/06* (2013.01); *C08K 2201/004* (2013.01); *C08K 2201/014* (2013.01)

(56) References Cited

U.S. PATENT DOCUMENTS

| | | | |
|---|---|---|---|
| 2009/0004453 A1* | 1/2009 | Murai | B29C 43/003 428/299.1 |
| 2010/0189990 A1* | 7/2010 | Breault | H01M 4/8807 428/311.51 |
| 2013/0317161 A1* | 11/2013 | Konagai | B29C 70/12 524/495 |
| 2014/0004308 A1 | 1/2014 | Taniguchi et al. | |
| 2014/0356612 A1 | 12/2014 | Sano et al. | |
| 2015/0031257 A1 | 1/2015 | Ootsubo et al. | |

FOREIGN PATENT DOCUMENTS

| | | |
|---|---|---|
| JP | 2007-092072 A | 4/2007 |
| JP | 2007-269308 A | 10/2007 |
| JP | 2011-057811 A | 3/2011 |
| JP | 2011-157524 A | 8/2011 |
| JP | 2011-178891 A | 9/2011 |
| JP | 2011-213797 A | 10/2011 |
| JP | 2013-049208 A | 3/2013 |
| JP | 2013-166923 A | 8/2013 |
| JP | 2013-209446 A | 10/2013 |
| JP | 2014-189644 A | 10/2014 |
| WO | 2007-097436 A1 | 8/2007 |
| WO | 2012-108446 A1 | 8/2012 |
| WO | 2013094706 A1 | 6/2013 |
| WO | 2013-175581 A1 | 11/2013 |

OTHER PUBLICATIONS

May 12, 2015—(JP) ISA-237—App PCT/JP2015/053353—partial Eng Tran.
Oct. 28, 2015—(JP) IPEA-409—App PCT/JP2015/053353—partial Eng Tran.
May 12, 2015—International Search Report—Intl App PCT/JP2015/053353.

\* cited by examiner

CARBON FIBER REINFORCED MOLDING MATERIAL AND SHAPED PRODUCT

CROSS REFERENCE TO RELATED APPLICATIONS

This is a U.S. National Phase Application under 35 U.S.C. § 371 of International Application No. PCT/JP2015/053353, filed Feb. 6, 2015, which claims priority to Japanese Application 2014-026968 filed Feb. 14, 2015 and which was published Under PCT Article 21(2), the entire contents of which are incorporated herein by reference.

TECHNICAL FIELD

The present invention relates to a carbon fiber reinforced molding material and a shaped product thereof.

BACKGROUND ART

Composite materials reinforced by carbon fibers have been widely utilized for applications in general industry and in the field of sports, e.g. as structural materials of airplanes, vehicles and the like and for tennis rackets, golf shafts, fishing rods and so on, by making use of their high specific strength and specific elasticity. As to the forms of carbon fibers used in those applications, there are e.g. textile fabrics made from continuous fibers, UD sheets in which fibers are aligned in one direction, random sheets made by using cut fibers and nonwoven fabric.

In recent years, composites in which a thermoplastic resin is used as a matrix instead of a traditional thermosetting resin have received attention. However, most of them have been made into a shaped product by injection molding (e.g. Patent Document 1), and therefore reduction in fiber length has occurred during melt-kneading, resulting in lowering of mechanical strength.

In addition, another molding method has been developed in which a base material for molding use, specifically a mat made from discontinuous long fibers and impregnated with a thermoplastic resin, is heated up to a temperature higher than the melting temperature of the thermoplastic resin, charged into a mold adjusted to a temperature lower than the melting temperature or the glass transition temperature, and then formed by mold clamping.

In fiber-reinforced composite materials, as described in Patent Document 2, shaped articles obtained by molding a mat-shaped base material in which discontinuous long fibers are dispersed in X and Y directions (a planar direction) like nonwoven fabric are well-known to be superior in mechanical strength.

Patent Document 3 describes hybrid carbon fiber-reinforced thermoplastic resin composite materials wherein carbon microfibers, such as carbon nanotubes or carbon nanofibers, are added to carbon fibers having lengths of 20 mm or longer and provides prepregs having high bending strength and high strength in the direction lateral to the fiber axis. Reasons for such high strengths are considered to consist in that, when bending stress is imposed, deformation on the compressed side is suppressed because carbon microfibers enhance the compressive elasticity modulus of the matrix-forming thermoplastic resin and buckling of carbon fibers is reduced, and thereby a compression fracture mode is inhibited and thereby high tensile strength of carbon fibers is made effective, and besides, carbon microfibers are low in degree of orientation in the axial direction of carbon fibers and have a reinforcing effect in the direction lateral to the axial direction where reinforcing effect of carbon fibers cannot be expected.

Further, Patent Documents 4 and 5 describes fiber-reinforced materials in which a thermoplastic resin and two types of reinforcing fibers different in length are used.

CITATION LIST

Patent Documents

Patent Document 1: JP-A-2011-57811
Patent Document 2: WO 2013/094706
Patent Document 3: JP-A-2011-213797
Patent Document 4: JP-A-10-323829
Patent Document 5: JP-A-2011-157524

SUMMARY OF THE INVENTION

Problems that the Invention is to Solve

In Patent Document 2, however, flowability of the fiber-reinforced composite material is enhanced by substituting the short-fiber component excellent in flowability for a part of the long-fiber component; as a result, with the enhancement of the flowability, there occurs reduction in mechanical strength brought about by the long-fiber component which has excellent mechanical strength intrinsically. In uses requiring excellent mechanical properties in particular, there are demands for high reinforced-fiber contents. However, no solutions have been offered to the problem of finding techniques to improve mechanical properties while retaining flowability.

In the case of using carbon nanotubes or carbon nanofibers as in Patent Document 3, there has been tendency for the fibers with too short lengths to cause thickening or gelling of thermoplastic resin and make it difficult to flow the resin at the time of molding.

Further, even in the cases of using two types of reinforced fibers different in fiber length as in Patent Documents 4 and 5, the appearances after molding, properties of reinforced fibers filled into bosses or ribs in particular, have been found to be inferior especially when the fiber lengths of shorter reinforced fibers are uniform.

Objects of the invention are to provide a molding material which contains carbon fibers and a thermoplastic resin and is excellent in both mechanical strength and flowability, and to provide a shaped product which is obtained by molding such a molding material and has excellent mechanical strength.

Extensive studies made by the present inventors in order to solve the problems as mentioned above have allowed an improvement in flowability without significantly impairing the mechanical strength of a discontinuous long-fiber mat, thereby having reached a solution to the problems.

Means for Solving the Problems

We, the present inventors, have found through our extensive studies that the problems can be solved by the following means, thereby attaining the invention.

<1> A plate-shaped carbon fiber reinforced molding material including a thermoplastic resin, carbon fibers (A) and carbon fibers (B), wherein:

i) the carbon fibers (A) have fiber lengths ranging from 0.01 mm to less than 3 mm, ii) the carbon fibers (B) have fiber lengths ranging from 3 mm to less than 100 mm, iii) $1.0 < Lw_A/Ln_A < 3$ is satisfied where $Lw_A$ and $Ln_A$ are a weight-average fiber length and a number-average fiber length of the carbon fibers (A), respectively, and iv) the carbon fibers (B) are two-dimensionally randomly oriented.

<2> The carbon fiber reinforced molding material according to <1>, wherein the carbon fibers (A) are three-dimensionally randomly oriented.

<3> The carbon fiber reinforced molding material according to <1> or <2>, wherein $1.0 \leq Lw_B/Ln_B < 1.2$ is satisfied where $Lw_B$ and $Ln_B$ are a weight-average fiber length and a number-average fiber length of the carbon fibers (B), respectively.

<4> The carbon fiber reinforced molding material according to any one of <1> to <3>, wherein a weight ratio (by %) of the carbon fibers (A) and the carbon fibers (B) is from 5:95 to 95:5.

<5> The carbon fiber reinforced molding material according to any one of <1> to <4>, wherein:

1) the carbon fibers (B) include fiber bundles constituted by fibers of less than a critical number of single fiber defined by expression (1), single fibers and carbon fiber bundles (B1) constituted by fibers of the critical number of single fiber or more, 2) a proportion of the carbon fiber bundles (B1) is from 5 vol % to less than 95 vol % with respect to a total volume of the carbon fibers (B) in the carbon fiber reinforced molding material, and 3) an average fiber number ($N_B$) in the carbon fiber bundles (B1) satisfies relation (2);

$$\text{Critical number of single fiber} = 600/D_B \quad (1)$$

$$0.43 \times 10^4/D_B^2 < N_B < 6 \times 10^5/D_B^2 \quad (2)$$

where $D_B$ is an average fiber diameter (μm) of the carbon fibers (B).

<6> The carbon fiber reinforced molding material according to any one of <1> to <5>, wherein bending strength S is a value obtained by multiplying "qSa+(1−q)Sb" by a factor of 0.8 or greater where Sa represents a bending strength of a molding material (A) consisting of the carbon fibers (A) and the thermoplastic resin, Sb represents a bending strength of a molding material (B) consisting of the carbon fibers (B) and the thermoplastic resin, and q represents a weight ratio of the carbon fibers (A) content to a total content of the carbon fibers (A) and the carbon fibers (B).

<7> A shaped product formed by using the carbon fiber reinforced molding material according to any of <1> to <6>, wherein when a plate thickness in an area smallest in plate thickness of the shaped product is defined as a minimum plate thickness T (mm), (a) the number-average fiber length $L_{nA}$ of the carbon fibers (A) is shorter than T/2 (mm), and (b) the number-average fiber length $L_{nB}$ of the carbon fibers (B) is T (mm) or more.

<8> The shaped product according to <7>, wherein the minimum plate thickness T (mm) is 1 mm or more.

<9> A shaped product formed by using the carbon fiber reinforced molding material according to any one of <1> to <6>, wherein a proportion of an area of carbon fiber bundles (A1) defined below to the area of the total carbon fibers (A) is from higher than 0% to 50% when a cross section of the shaped product is observed in a plate thickness direction, and the carbon fiber bundles (A1) belong to the carbon fibers (A) and are carbon fiber bundles in which the number of fibers is observed by at least $35/D_A$ where $D_A$ is an average fiber diameter (μm) of the carbon fibers (A).

Advantage of the Invention

According to the invention, it has become possible to provide a molding material which includes carbon fibers and a thermoplastic resin and is excellent in not only mechanical strength but also flowability, and further to provide a shaped product which is obtained by molding such a molding material and is excellent in mechanical strength.

The molding material according to the invention contains carbon fibers (A) whose fiber length ranges from 0.01 mm to less than 3 mm and carbon fibers (B) whose fiber length ranges from 3 mm to less than 100 mm. Even though relatively long carbon fibers (B) are present in this way, they don't impair the flowability at the time of molding, the present molding material is easily improved in mechanical properties, and hence it allows applications to components of which high rigidity, high strength and excellent design property are required.

In particular, by distributing fiber lengths of the carbon fibers (A) in a broad range, it has become possible to achieve enhancement of flowability while keeping high rigidity and high strength.

Because of its feasibility of thickness reduction and isotropic properties, the present shaped product can be used for a wide variety of constitutional members, such as inner plates, outer plates and structural members of vehicles, or various electrical appliances, or frames and housings of machines.

MODE FOR CARRYING OUT THE INVENTION

Overview

<<Molding Material>>

Figure 1:
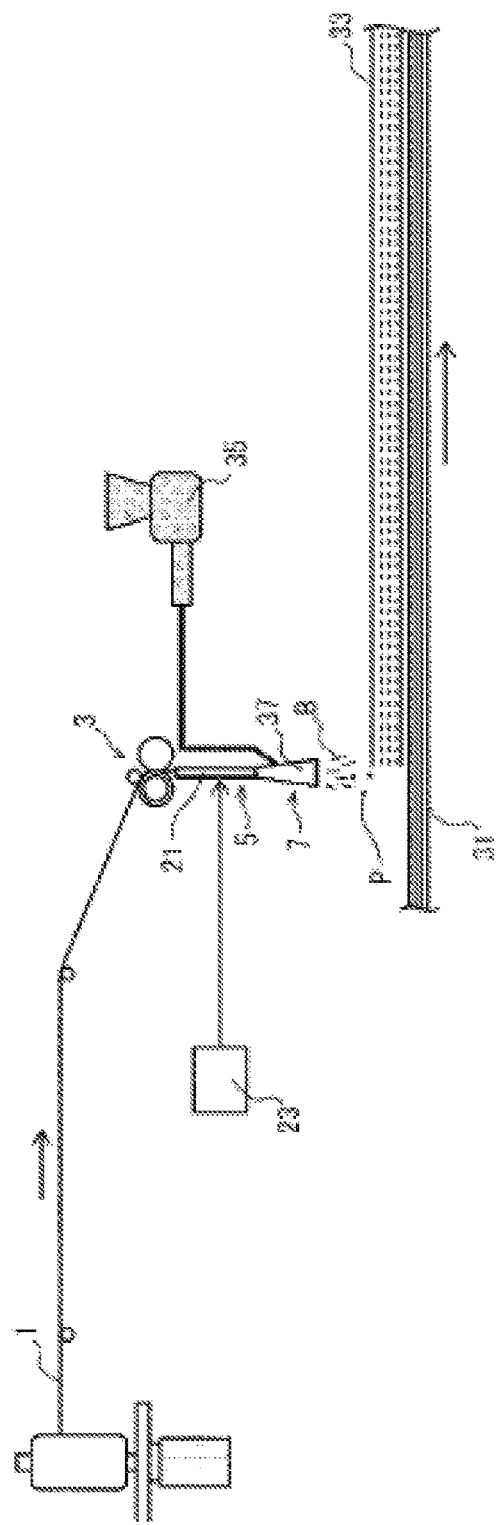
FIG. 1 is a schematic diagram showing part of processes in an example of a method for molding a molding material.
Figure 2:
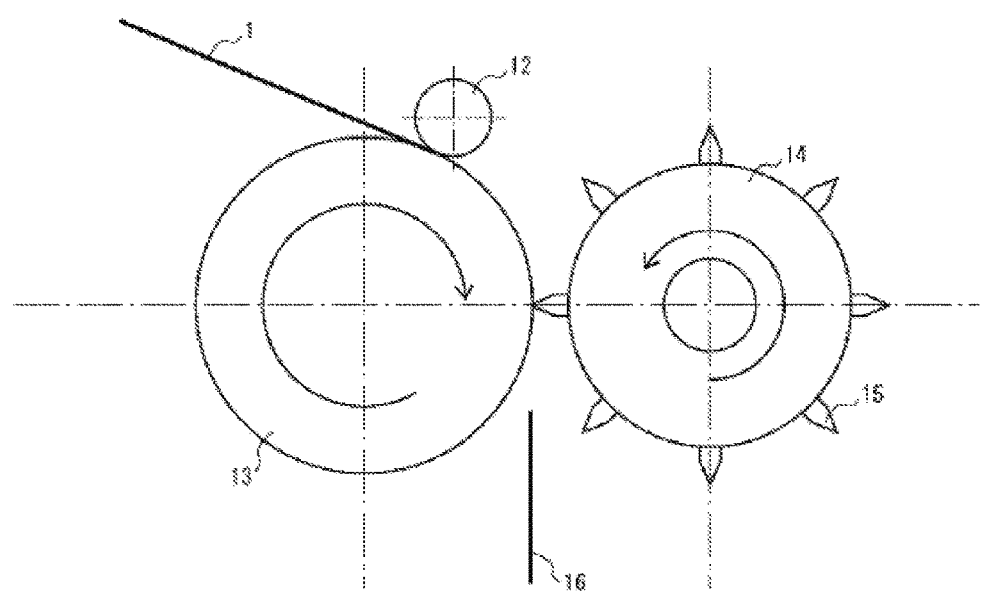
FIG. 2 is a schematic diagram of a cut process.

The molding material as an embodiment of the invention is a carbon fiber reinforced molding material (carbon fiber reinforced thermoplastic resin molding material), which is a plate-shaped carbon fiber reinforced molding material including a thermoplastic resin, carbon fibers (A) and carbon fibers (B), wherein:

i) the carbon fibers (A) have fiber lengths ranging from 0.01 mm to less than 3 mm;

ii) the carbon fibers (B) have fiber lengths ranging from 3 mm to less than 100 mm;

iii) $1.0 < Lw_A/Ln_A < 3$ where $Lw_A$ represents the weight-average fiber length of the carbon fibers (A) and $Ln_A$ represents the number-average fiber length of the carbon fibers (A); and iv) the carbon fibers (B) are two-dimensionally randomly oriented.

The present carbon fiber reinforced molding material (simply referred to as "the molding material" in some cases) is a plate-shaped thermoplastic resin in a same plate of which both the carbon fibers (A) and the carbon fibers (B) are present, preferably a molding material containing both the carbon fibers (A) and the carbon fibers (B) in a section formed by cutting the material in parallel to its surface. For example, a molding material in which a layer containing the carbon fibers (A) in some thermoplastic resin and a layer containing the carbon fibers (B) in the other thermoplastic resin are layered together is not included.

However, a molding material as an embodiment of the invention includes a molding material formed by layering a plurality of plates in each of which both the carbon fibers (A) and the carbon fibers (B) are present.

[Carbon Fibers (A)]

(Kind)

As to the carbon fibers (A), there are generally known polyacrylonitrile (PAN) base carbon fibers, petroleum or coal base carbon fibers, rayon base carbon fibers, cellulose base carbon fibers, lignin base carbon fibers, phenol base carbon fibers, vapor-phase epitaxy base carbon fibers and so on. Any of these varieties can be used suitably.

Among them, acrylonitrile (PAN) base carbon fibers are preferably used, and it is appropriate for them to have a tensile modulus of elasticity in a range of 100 GPa to 600 GPa, preferably in a range of 200 GPa to 500 GPa, far preferably in a range of 230 GPa to 450 GPa. In addition, it is appropriate for them to have tensile strength in a range of 2,000 MPa to 10,000 MPa, preferably in a range of 3,000 MPa to 8,000 MPa.

(Fiber Length of Carbon Fibers (A) Incorporated into Molding Material)

Of carbon fibers incorporated into the molding material, those having a fiber length ranging from 0.01 mm to less than 3 mm are defined as the carbon fibers (A). On the other hand, those having a fiber length ranging from 3 mm to less than 100 mm are classified as the carbon fibers (B).

1. Range of Weight-Average Fiber Length $Lw_A$

The weight-average fiber length $Lw_A$ of the carbon fibers (A) has no particular limits, but the lower limit thereof is preferably 0.05 mm, far preferably 0.1 mm, further preferably 0.2 mm. When the weight-average fiber length of the carbon fibers (A) is 0.05 mm or greater, mechanical strength is secured.

On the other hand, the upper limit of the weight-average fiber length $Lw_A$ of the carbon fibers (A) is preferably 2 mm, far preferably 1 mm, further preferably 0.5 mm. Meanwhile, the weight-average fiber length $Lw_A$ of the carbon fibers (A) is determined by the expressions (3) and (4) described below.

2. Number-Average Fiber Length Ln

When the fiber length of each individual carbon fiber is represented by Li, the number-average fiber length Ln and weight-average fiber length Lw of carbon fibers in the molding material are generally determined by the following expressions (3) and (4), respectively. Meanwhile, the unit of the number-average molecular weight Ln and the weight-average fiber length Lw are expressed in mm.

$$Ln = \Sigma Li / I \quad (3)$$

$$Lw = (\Sigma Li^2)/(\Sigma Li) \quad (4)$$

Herein, "I" represents the number of carbon fibers measured.

3. Ratio Between Weight-Average Fiber Length $Lw_A$ and Number-Average Fiber Length $Ln_A$ The ratio between the weight-average fiber length Lw and number-average fiber length Ln of carbon fibers, Lw/Ln, is generally a yardstick for showing a width of the fiber length distribution of carbon fibers. For example, Lw/Ln becomes 1 when all the carbon fibers have the same fiber length, and the broader the fiber length distribution, the greater the ratio Lw/Ln becomes.

As to the carbon fibers (A), the range of $Lw_A/Ln_A$ is from greater than 1.0 to smaller than 3, preferably from 1.3 to smaller than 2.8, far preferably from 1.6 to smaller than 2.4.

It is appropriate that the fiber length distribution of the carbon fibers (A) be of a specified width (be broad). By the carbon fibers (A) being present with a fiber length distribution, the effect of increasing interlayer shear strength of the molding material can be expected. Although definite reasons for such an effect are unclear, there can be assumed a reason that by the fiber length distribution being broad (specifically by the ratio Lw/Ln being from greater than 1.0 to smaller than 3), it occurs selectively as appropriate that carbon fibers having long fiber lengths become embedded easily in large ones among interstices between the carbon fibers (A) and those having short fiber lengths become embedded easily in small ones among interstices between the carbon fibers (A). In other words, it is assumed that, when the fiber length distribution of the carbon fibers (A) is broad, fine ones among the carbon fibers (A) become embedded in small spaces to result in a rise of filling rate.

Figure 8:
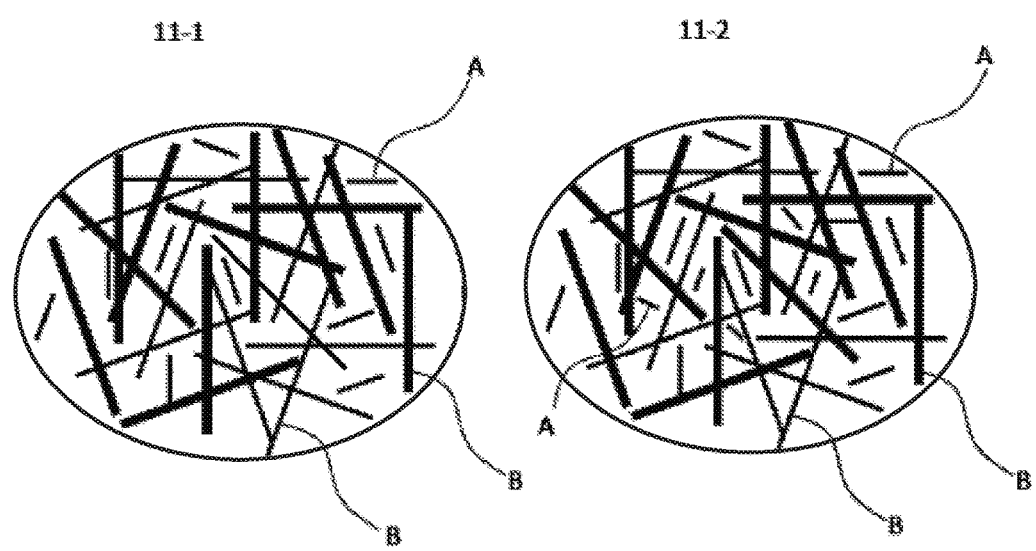
FIG. 8 includes schematic diagrams showing a molding material 11-1 in which carbon fibers (A) have a uniform fiber length and a molding material 11-2 in which carbon fibers (A) have a broad fiber-length distribution.

FIG. 8 schematically shows a molding material 11-1 containing carbon fibers (A) uniform in fiber length and a molding material 11-2 containing carbon fibers (A) broad in fiber length distribution. The molding material 11-2 can be cited as an example of molding materials according to the invention.

4. Relation Between Number-Average Fiber Length $Ln_A$ and Plate Thickness of Shaped Product In the shaped product formed by using a molding material according to the invention, when the plate thickness of the shaped product in an area smallest in plate thickness is defined as a minimum plate thickness T (mm), it is appropriate that the number-average fiber length $Ln_A$ of the carbon fibers (A) be shorter than T/2 (mm). And it is also appropriate that the carbon fibers (A) be present in the molding material so as to ensure a number-average fiber length $Ln_A$ shorter than T/2 (mm) in the shaped product.

5. Random Orientation in Three Directions

It is appropriate for the carbon fibers (A) to be three-dimensionally randomly oriented. The wording "three-dimensional random orientation" means that there is little difference between orientations of carbon fibers in specified three-dimensional directions orthogonal to each other. More specifically, it means that carbon fibers are oriented in similar proportions in any set of three-dimensional directions orthogonal to each other and, in the molding material, the carbon fibers (A) are uniformly dispersed in arbitrary all directions including an in-plane direction and a thickness direction.

An evaluation of random orientation is made by the number of sections of carbon fibers (A) observed on each of planes orthogonal three-dimensionally to each other. Details of the evaluation method are described below. Additionally, by the carbon fibers oriented randomly in three-dimensional directions, mechanical strengths, notably high bending strength become excellent.

6. Form

The carbon fibers (A) have no particular restrictions as to their form.

As to the form thereof, "carbon fibers" include not only those in the form of single fibers but also those in the form of bundles each of which a plurality of singe fibers gather in, and most of general carbon-fiber products now on the market have the form of fiber bundles each of which 1,000 to 100,000 (preferably several thousands to several tens of thousands) of single fibers gather in.

When such carbon fibers are used as they are, entangled portions of fiber bundles become a cause of local thickening, and may make it difficult to obtain a thin molding material. In order to avoid this, there have been many cases where, in advance of using them, carbon fiber bundles were subjected e.g. to widening or opening of each bundle.

Accordingly, the carbon fibers (A) may be in the form of either single fibers or fiber bundles, or a mixture of the both. In point of improvement in flowability of the molding material, however, it is preferred to use single fiber-rich carbon fibers.

(1) Carbon Fiber Bundles (A1)

It is appropriate that the carbon fibers (A) include carbon fiber bundles (A1) each of which is composed of at least a specified number of carbon fibers. These carbon fiber bundles (A1) are included in the carbon fibers (A), and the number of fibers in each bundle is at least $35/D_A$, where $D_A$ is an average fiber diameter of the carbon fibers (A) and the unit thereof is in μm.

(2) Area Proportion of Carbon Fiber Bundles (A1)

Figure 5:
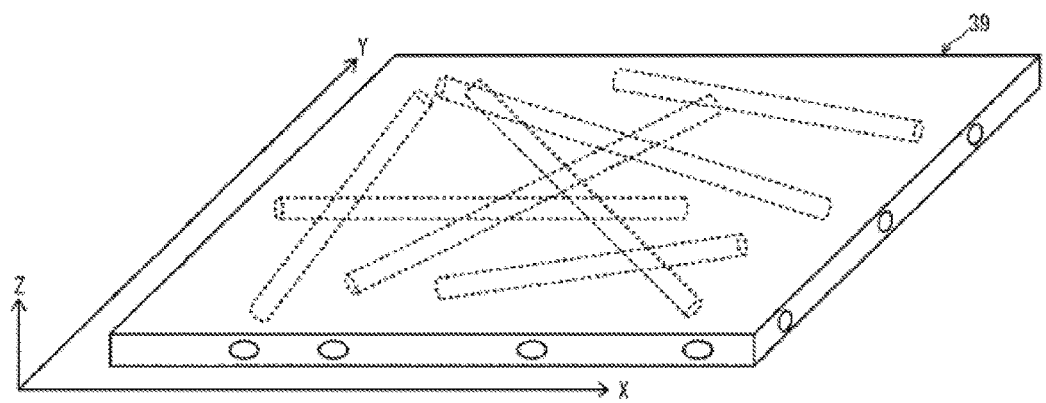
FIG. 5 is a schematic view showing an example of a molding material.

It is appropriate that the molding material contain carbon fiber bundles (A1) in such an area proportion that, under observation of cross sections in the plate-thickness direction (e.g. in the Z direction in FIG. 5) of a shaped product formed using the molding material, the area of the carbon fiber bundles (A1) constitutes larger than 0% to 50% of the total area of the carbon fibers (A). By the way, the term "a cross section in the plate-thickness direction" refer to a cross section in the same plane as a plane orthogonal to the plate-thickness direction. In FIG. 5, the cross sections in the plate-thickness direction include the XZ plane and the YZ plane.

When the area proportion of the carbon fiber bundles (A1) to the total carbon fibers (A) is 50% or lower, carbon fibers in single-fiber form are present in large numbers, and hence it becomes easy to ensure mechanical strengths, notably bending strength.

The area proportion of the carbon fiber bundles (A1) to the total carbon fibers (A) is preferably in a range of larger than 0% to 30%, far preferably in a range of larger than 0% to 15%.

By allowing the carbon fiber bundles (A1) each of which is composed of at least a specified number of carbon fibers to co-reside with opened carbon fibers or other carbon fiber bundles in a specified proportion, it becomes possible to increase the amount of the carbon fibers (A) present in the molding material or the shaped product, namely the fiber volume fraction Vf (unit: Vol %) of the carbon fibers (A).

While there are no particular restrictions as to the method for incorporating a large number of single fibers into the carbon fibers (A) and adjusting the area proportion of the carbon fiber bundles (A1) to the total carbon fibers (A) to fall within a range of larger than 0% to 50% when the molding material is formed into a shaped product, it is possible to adopt e.g. a method of utilizing air opening or a paper-making method using water dispersion. Alternatively, many single fibers can be incorporated into the carbon fibers (A) by melt-kneading of a granular material (R) mentioned hereafter.

7. Method for Obtaining Carbon Fibers (A)

The manufacturing method of the carbon fibers (A) has no particular restrictions, and thereto the following methods can be applied.

At the occasion of incorporating the carbon fibers (A) into the molding material, commercial carbon fiber-containing resin pellets, scrap pieces obtained in the process of manufacturing carbon fiber-reinforced thermoplastic resin composite materials (including molding materials and shaped products) or the like may be adopted.

As an example of the carbon fiber-containing resin pellets, mention may be made of long fiber-reinforced plastics PLASTRON (registered trademark) produced by Daicel Corporation. As examples of the scrap pieces, mention may be made of pulverized materials obtained by pulverizing, with a commercially available plastic crusher, the two-dimensionally isotropic composite materials as disclosed in JP-A-2011-178891 and JP-A-2011-178890 and the unidi-rectional material composite as disclosed in JP-A-2012-236897, respectively (hereinafter, simply referred to as "pulverized materials" in some cases). In the present specification, commercially available carbon fiber resin pellets, the pulverized materials and the like are collectively described as granular material (R).

When carbon fibers (A) are prepared in the form of resin pellets made by melt-kneading a granular material (R) together with a thermoplastic resin and so on, the carbon fibers (A) including fibers in single-fiber form in a high proportion can be obtained by virtue of shearing force under kneading.

The cases of preparing granular materials (R) from scrap pieces generated in the process of manufacturing or molding composite materials allow contribution to reduction in manufacturing costs, resource savings and global environment conservation.

As a matter of course, when the form of carbon fibers incorporated into a carbon fiber reinforced thermoplastic resin composite material prepared beforehand is a single-fiber form, it is unnecessary to provide e.g. a melt-kneading process for making resin powder (P) as described hereafter because carbon fibers in single-fiber form are already present in the pulverized material obtained by pulverizing such a composite material.

For example, in the cases of preparing carbon fibers (A) by pulverizing the shaped products or composite materials as described e.g. in International Publication Nos. WO2007/097436, WO2010/013645 and WO2013/099741, the shaped products or the composite materials contain carbon fibers in single-fiber form in a dispersed state, and in the pulverized materials obtained by pulverizing them are present carbon fibers in single fiber form; as a result, the pulverized materials can be used in the next process as they are without providing the melt-kneading process.

Further, as to the method of producing the molding material through the use of resin pellets containing carbon fibers (A) in single-fiber form or a pulverized material, there are no particular restrictions. As an example of the production method, a method is exemplified in which, in order to form carbon fibers (A), carbon fibers (B) and a thermoplastic resin into the shape of a plate, the resin pellets or pulverized material is made to be in powdery form (this powdery material is defined as resin powder (P)), and the resulting material is mixed into a carbon fiber mat made of carbon fibers (B) described hereafter.

As to the method of mixing carbon fibers (A) into a thermoplastic resin for use in the molding material, there are no particular restrictions. For example, it is possible to use the thermoplastic resin powder prepared by further pulverizing resin pellets formed by melt-kneading of a granular material (R) (hereafter described simply as "resin powder (P)" in some cases).

The shape of resin powder (P) is not limited to particular ones. For example, the resin powder (P) can be shaped into grains. Besides being present of the carbon fibers (A) in a resin powder (P), the resin powder (P) is shaped into grains, and thereby it becomes easy to mix the carbon fibers (A) with carbon fiber (B) and possible to orient the carbon fibers (A) more equally in three-dimensional directions within the molding material. In addition, the number of carbon fibers (A) in single-fiber form can be increased by undergoing melt-kneading once.

(2) Case in which Number-Average Fiber Length $Ln_A$ is Longer than 1 mm

When the number-average fiber length $Ln_A$ is longer than 1 mm, there occurs clogging of the 2-mm φ orifice in a Melt Index measuring instrument. Accordingly, the flow length measuring method using an injection molding machine is preferably used. As to the flowability of a molding material (A) containing only carbon fibers (A) and a thermoplastic resin, it is appropriate that the molding material (A) have a flow length of 30 mm or more, preferably 40 mm or more, under the resin pressure of 50 MPa.

[Carbon Fibers (B)]
(Kind)

As to the carbon fibers (B), there are generally known polyacrylonitrile (PAN) base carbon fibers, petroleum or coal base carbon fibers, rayon base carbon fibers, cellulose base carbon fibers, lignin base carbon fibers, phenol base carbon fibers, vapor-phase epitaxy base carbon fibers and so on. Any of these varieties can be used suitably.

Among them, acrylonitrile (PAN) base carbon fibers are preferably used, and it is appropriate for them to have a tensile modulus of elasticity in a range of 100 GPa to 600 GPa, preferably in a range of 200 GPa to 500 GPa, far preferably in a range of 230 GPa to 450 GPa. In addition, it is appropriate for them to have tensile strength in a range of 2,000 MPa to 10,000 MPa, preferably in a range of 3,000 MPa to 8,000 MPa.

(Fiber Length of Carbon Fibers (B) Incorporated into Molding Material)

Of carbon fibers incorporated into the molding material, those having fiber lengths ranging from 3 mm to less than 100 mm are defined as carbon fibers (B).

The carbon fibers (B) are long in fiber length as compared with the carbon fibers (A), and hence they can ensure mechanical properties (notably long-term fatigue strength), but the fiber lengths longer than 100 mm impair flowability.

1. Range of Weight-Average Fiber Length $Lw_B$

The weight-average fiber length $Lw_B$ of the carbon fibers (B) has no particular limits, but the lower limit thereof is preferably 5 mm, far preferably 10 mm, further preferably 15 mm. In point of flowability under molding, the upper limit of the weight-average fiber length $Lw_B$ of the carbon fibers (B) is preferably 80 mm, far preferably 50 mm, further preferably 30 mm.

More specifically, the fiber length distribution of the carbon fibers (B) has at least one peak, and the peak is preferably in a range of 10 mm to 30 mm. By the way, the weight-average fiber length $Lw_B$ of the carbon fibers (B) is determined by the expression (4) described hereinbefore.

2. Range of Number-Average Fiber Length $Ln_B$

The number-average fiber length of carbon fibers (B), $Ln_B$, has no particular limits, but it is appropriate that, when the minimum plate thickness of a shaped product is represented by T (mm), the number-average fiber length $Ln_B$ in the shaped product be T (mm) or greater. By the way, the number-average fiber length $Ln_B$ of the carbon fibers (B) is determined by the expression (3) described hereinbefore.

As to the fiber lengths, for the purpose of allowing reinforcing effect of fibers to develop, fibers longer in the number-average fiber length Ln are the more desirable, and the number-average fiber length $Ln_B$ of T (mm) or greater conduces to a desirable result that, under flowing at the time of execution of molding, the carbon fibers resist aligning in the direction of plate thickness in an article to be molded, and thereby lowering of flowability can be inhibited.

Herein, characteristics of the carbon fibers in the molding material are retained on the almost same level in the resulting shaped product also. It is therefore appropriate that the number-average fiber length $Ln_B$ be T (mm) or greater where the minimum plate thickness of the molding material is represented by T (mm). Moreover, the number-average fiber length $Ln_B$ is preferably at least two times, far preferably at least 5 times, the minimum plate thickness T (mm) of the molding material.

The upper limit of the number-average fiber length $Ln_B$ has no particular restrictions, but it is preferably 50 mm or below, far preferably 20 mm or below, from the viewpoint of retaining flowability.

3. Ratio Between Weight-Average Fiber Length $Lw_B$ and Number-Average Fiber Length $Ln_B$ The fiber lengths of carbon fibers (B) have no particular restrictions so long as they are in the foregoing range, but a rotary cutter as described hereafter or the like may be used for the purpose of attaining preferred fiber lengths. In such a case, from the viewpoint of production consistency, it is appropriate to narrow the width of a fiber length distribution of carbon fibers (B).

Accordingly, it is appropriate that the range of $Lw_B/Ln_B$, which is the ratio between the weight-average fiber length of carbon fibers (B), $Lw_B$, and the number-average fiber length of carbon fibers (B), $Ln_B$, is from 1.0 to smaller than 1.2, preferably from 1.0 to smaller than 1.1.

The $Lw_B/Ln_B$ is, as explained in one of the paragraphs about the carbon fibers (A), a yardstick for showing a width of the fiber length distribution of carbon fibers.

4. Random Orientation in Two Directions

In the molding material, the carbon fibers (B) are two-dimensionally randomly oriented. The wording "two-dimensionally randomly" means that there is little difference between orientations of carbon fibers in a specified direction in a plane and those in any other directions in the plane.

Herein, an evaluation of the random orientation in two directions is made quantitatively by determining a ratio between tensile moduli in two directions orthogonal to each other.

To be more specific, when the ratio obtained by dividing the greater one by the smaller one of the values of tensile modulus in two directions in the molding material is 3 or below, the carbon fibers (B) in such a molding material are assessed as being in a state of two-dimensional random orientation. When this ratio is 2 or below, the carbon fibers (B) are assessed as being excellent in two-dimensional random orientation, and when the ratio is 1.3 or below, they are assessed as being more excellent.

As to the method for making carbon fibers (B) two-dimensionally randomly orient, there is no particular restriction, but it is advantageous to shape the carbon fibers (B) into a mat form, and by having a mat form the carbon fibers (B) are free from orientation in specified directions and can be randomly arranged in a dispersed condition. When the carbon fibers (B) are formed into a carbon fiber mat, the resulting molding material can be a molding material having excellent in-plane isotropy, and the isotropy of the molding material is also retained when the material is formed into a shaped product.

5. Form

The carbon fibers (B) have no particular restrictions as to their form.

The form of carbon fibers (B) may be either a form of single fibers or a form of bundles each of which a plurality of single fibers gather in, or the both forms. In the case of using carbon fibers in bundle form, the number of single fibers constituting each bundle may be almost the same as or different from that of other bundles.

When they contain carbon fiber bundles in particular, the carbon fibers (B) are preferably shaped into a carbon fiber mat. It is appropriate that the carbon fibers (B) incorporated into the molding material satisfy the following conditions 1) to 3):

1) the carbon fibers (B) include fiber bundles of such a type that the number of fibers constituting each bundle is smaller than a critical number of single fiber defined by the following expression (1), single fibers and carbon fiber bundles (B1) of such a type that the number of carbon fibers constituting each bundle is larger than the critical number of single fiber, 2) as to the carbon fiber bundles (B1), their proportion is from 5 vol % to less than 95 vol % with respect to the total volume of the carbon fibers (B) in the carbon fiber reinforced molding material, and 3) an average fiber number ($N_B$) in carbon fiber bundles (B1) satisfies the following relation (2);

$$\text{Critical number of single fiber}=600/D_B \quad (1)$$

$$0.43\times10^4/D_B^2<N_B<6\times10^5/D_B^2 \quad (2)$$

where $D_B$ is an average fiber diameter (unit: μm) of the single carbon fibers (B).

The relation (2) is preferably the following relation (2').

$$0.6\times10^4/D_B^2<N_B<6\times10^5/D_B^2 \quad (2')$$

6. Degree of Opening (1) Opening

When the carbon fibers (B) are in the form of bundles, the number of single fibers constituting each bundle is not limited to particular ones, but it is usually adjusted to fall within the range of 1,000 to 100,000.

In general, carbon fibers have the form of fiber bundles each of which several thousands to several tens of thousands of single fibers (filaments) gather in. When such carbon fibers are used as they are, entangled portions of fiber bundles become a cause of local thickening, and may make it difficult to obtain thin molding materials. In order to avoid this, there are many cases where, in advance of using them, carbon fiber bundles are subjected e.g. to widening or opening.

When fiber bundles after having undergone opening are used, the degree to which the fiber bundles have been opened has no particular limits, but it is appropriate that the opening degree of fiber bundles is controlled and the carbon fibers (B) contain fiber bundles each of which is constituted by a specified number or larger of single fibers and either single fibers or fiber bundles each of which is constituted by smaller than the specified number of single fibers.

More specifically, it is appropriate that the carbon fibers (B) are constituted by carbon fiber bundles (B1) in which the number of single fibers constituting each bundle is at least a critical number of single fiber defined by the above-mentioned expression (1) and other opened-carbon fibers (namely either single fibers or fiber bundles in which the number of single fibers constituting each bundle is smaller than the critical number of single fiber).

By the way, the carbon fibers other than the carbon fiber bundles (B1) in the carbon fibers (B) are referred to as single fibers and others (B2).

(2) Proportion of Carbon Fiber Bundles (B1)

It is appropriate that the proportion of the carbon fiber bundles (B1) to the carbon fibers (B) in a molding material be from higher than 5 vol % to lower than 95 vol %, preferably from higher than 10 vol % to lower than 90 vol %, far preferably from 20 vol % to lower than 90 vol %, further preferably from 30 vol % to lower than 90 vol %, furthermore preferably from 50 vol % to lower than 90 vol %.

By allowing the carbon fiber bundles (B1) each of which is constituted by at least the specified number of carbon fibers (B) to co-reside with single fibers and others (B2) as other opened-carbon fibers (B) in the proportion as specified above, it becomes possible to increase the amount of the carbon fibers (B) present in the molding material, namely the fiber volume fraction Vf (unit: Vol %) of the carbon fibers (B).

When the proportion of the carbon fiber bundles (B1) to the total carbon fibers (B) is increased, not only it becomes easy to obtain a shaped product having excellent physical properties through the molding of the resulting molding material, but also the occurrence of entanglement of fibers is reduced because fibers in single-fiber form become small in number, and thereby flowability is enhanced.

As far as the proportion of the carbon fiber bundles (B1) is lower than 95 vol %, local thickening attributable to entanglement of fibers can be avoided and it becomes easy to obtain thin moldings.

(3) Average Fiber Number ($N_B$) of Carbon Fiber Bundles (B1)

The average fiber number ($N_B$) in the carbon fiber bundles (B1) can be determined as appropriate within the scope of not impairing functions of the carbon fiber bundles (B1), and has no particular limits.

Depending on the carbon fibers used, the average fiber number $N_B$ in the carbon fiber bundles (B1) is adjusted to within the range $1<N_B<12,000$, and preferably satisfies the relation (2) mentioned above. In such a range, the average fiber number ($N_B$) is preferably smaller than $3\times10^5/D_B^2$, far preferably smaller than $6\times10^4/D_B^2$. And the lower limit thereof is preferably $0.6\times10^4/D_B^2$, far preferably $0.7\times10^4/D_B^2$.

(4) Method for Opening

As to the method for opening the carbon fibers (B), there are no particular restrictions. Examples of such an opening method include a method of utilizing air opening and a paper-making method using water dispersion.

It is possible to adjust the opening degree of the carbon fibers (B) to fall within an intended range by controlling the opening conditions of the fiber bundles. For example, in the case of making fiber bundles open by blowing air on carbon fibers to be opened (air opening), the opening degree can be adjusted by controlling e.g. the pressure of air blow to be given on the fiber bundles.

Therein, there is a tendency that increasing the air pressure makes the opening degree higher (lessens the number of fibers constituting each bundle), while decreasing the air pressure makes the opening degree lower (reduces a decrement in the number of fibers constituting each bundle).

Alternatively, it is also possible to control the opening degree by adjusting the size, e.g. the bundle width or the number of fibers per width, of fiber bundles to be subjected to a cut process for cutting carbon fibers into specified lengths. To be more specific, there are a method of expanding the width of fiber bundles by opening or the like and then subjecting the resulting fiber bundles to a cut process, and a method of providing in advance of a cut process a slit process of forming longitudinal slits (slits parallel to the stretching direction of fibers) in carbon fibers. Additionally, as mentioned below, the fiber bundles may be subjected to cutting and slitting at the same time.

More specifically, when the average fiber diameter of the carbon fibers (B) is in a range of 5 μm to 7 μm, the critical single-fiber number falls in a range from higher than 86 to lower than 120, and when the average fiber diameter of the carbon fibers (B) is 5 μm, the average fiber number in fiber bundles falls in a range from higher than 172 to lower than 24,000. Of such average fiber numbers, the range of higher than 280 to lower than 12,000 is preferred, the range of higher than 280 to lower than 4,000 is far preferred, the range of higher than 600 to lower than 2,500 is further preferred, and the range of higher than 600 to lower than 1,600 is furthermore preferred.

When the average fiber diameter of the carbon fibers is 7 μm, the average fiber number in fiber bundles falls in a range from higher than 88 to lower than 12,245. Of such average fiber numbers, the range of higher than 122 to lower than 12,245 is preferred, the range of higher than 142 to lower than 6,122 is far preferred, the range of higher than 300 to lower than 1,500 is further preferred, and the range of higher than 300 to lower than 800 is furthermore preferred.

[Relationship Between Carbon Fibers (A) and Carbon Fibers (B)]

The ratio by weight between the carbon fibers (A) and the carbon fibers (B) has no particular limits, but it is preferably from 5:95 to 95:5 (carbon fibers (A):carbon fibers (B)).

In other words, the proportion of the weight of the carbon fibers (A) to the sum of the weights of the carbon fibers (A) and carbon fibers (B) is preferably from 5 weight % to 95 weight %, far preferably from 5 weight % to 50 weight %, and further preferably from 10 weight % to 30 weight %. This is because, when the proportion by weight of the carbon fibers (A) is 5 weight % or higher, the effect of increasing mechanical strength is recognized, while the proportions of 95 weight % or lower allow increase in flowability of carbon fibers (A)-containing thermoplastic resin in itself.

On the other hand, the proportion of the weight of the carbon fibers (B) to the sum of the weights of the carbon fibers (A) and carbon fibers (B) is preferably from 95 weight % or below to 5 weight % or above, far preferably from 95 weight % or below to 50 weight % or above, and further preferably from 90 weight % or below to 70 weight or above. This is because, when the proportion by weight of the carbon fibers (B) is 5 weight % or above, the fiber-reinforcing effect is great, and when the proportion by weight is 95 weight % or below, the flowability is enhanced.

[Molding Material]

(Shape)

The molding material has a plate shape. The term plate shape refers to a shape that the length in the plate-thickness direction (namely the plate thickness) is relatively short as compared with the lengths in the vertical and lateral directions, and the shape viewed from the direction parallel to the plate-thickness direction may be any of shapes including not only a square and a rectangle, but also polygons such as a triangle, a quadrangle, and a pentagon, a circle, a semicircle, a segment of circle and so on.

When the maximum length and the minimum length in the lateral and vertical directions and the average plate thickness of the molding material are represented by Lmax, Lmin and D, respectively, it is appropriate to satisfy relations Lmax/D≥3 and Lmin/D≥2. Additionally, the plate shape may be such a shape that, with trending one end to the other end in either the lateral direction or the vertical direction, the plate thickness not only varies linearly but also fluctuates on the way, or it may be a plate shape curved with a curvature of at least 1.

The plate thickness of the molding material is not limited to particular ones, and it is possible for the plate to have various thicknesses. Specifically, the plate thickness may be chosen from the range of 0.2 mm to 5 mm, or it may be a thin on the order of 3 mm or below.

(Fiber Areal Weight)

The fiber areal weight concerning the total quantity of all carbon fibers incorporated into a molding material has no particular limits, but it is usually adjusted to fall in a range of 25 g/m$^2$ to 10,000 g/m$^2$. And it is appropriate that the fiber areal weight concerning the total quantity of the carbon fibers (A) and the carbon fibers (B) be from 25 g/m$^2$ to 3,000 g/m$^2$, preferably from 25 g/m$^2$ to 500 g/m$^2$.

(Fiber Length Ratio of Carbon Fibers (A) to Carbon Fibers (B))

As to the relationship between a weight-average fiber length of the carbon fibers (A), $Lw_A$, and a weight-average fiber length of the carbon fibers (B), $Lw_B$, it is appropriate that the ratio $Lw_A/Lw_B$ be from 0.005 to lower than 0.5, preferably from 0.01 to lower than 0.1, far preferably 0.01 to lower than 0.05.

As long as the ratio $Lw_A/Lw_B$ is in such ranges, the carbon fibers (A) can be regarded as an object which is the same in behavior as a thermoplastic resin as matrix and easily becomes embedded in interstices formed by the carbon fibers (B).

(About Theory of Additivity Law)

It is appropriate that the molding material have its bending strength S, one of its mechanical strengths, in a range that the relation S≥(qSa+(1−q)Sb)×0.8 holds.

Herein,

Sa: bending strength of the molding material (A) consisting of the carbon fibers (A) and the thermoplastic resin, Sb: bending strength of the molding material (B) consisting of the carbon fibers (B) and the thermoplastic resin, and q: ratio by weight of the carbon fibers (A) content to the sum of the carbon fibers (A) content and the carbon fibers (B) content.

The appropriate bending strength S is preferably in a range of $(qSa+(1-q)Sb) \times 0.9$ or more, far preferably in a range of $(qSa+(1-q)Sb) \times 1.0$ or more, further preferably in a range of a value obtained by multiplying $(qSa+(1-q)Sb)$ by a factor beyond 1.0 or more (namely $S > qSa+(1-q)Sb$).

Figure 6:
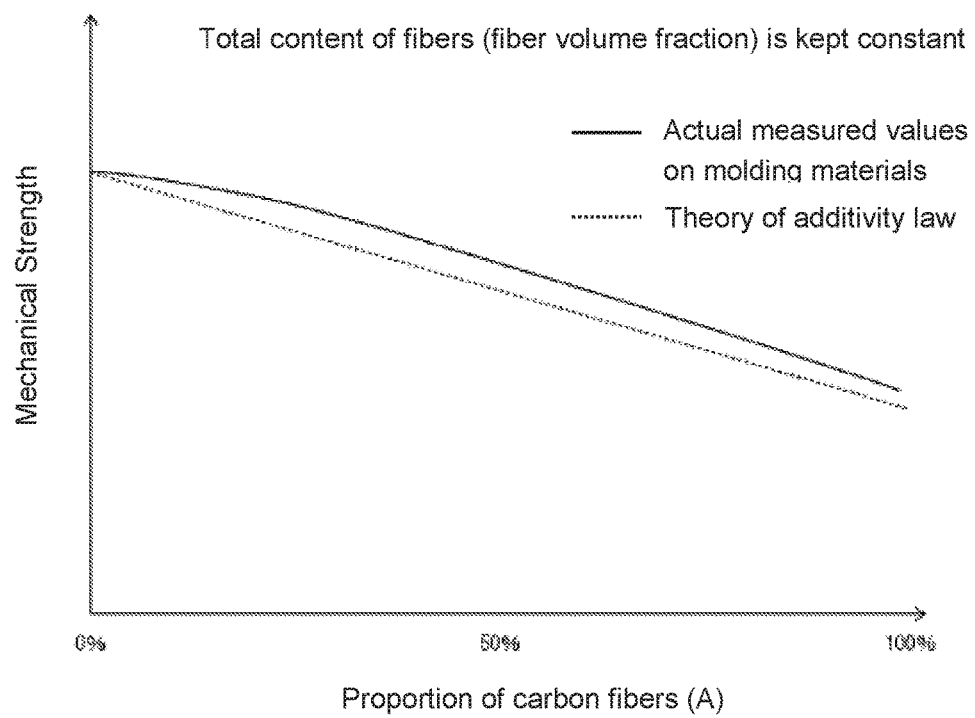
FIG. 6 is a schematic diagram displaying graphically a relation between mechanical strength and proportion of carbon fibers (A) to the total of carbon fibers (A) and carbon fibers (B).

In general, when two types of carbon fibers (A) and (B) have been mixed into the molding material, only relatively long carbon fibers (B) develop their mechanical strength and the mechanical strength development rate of relatively short carbon fibers (A) becomes low, and hence the molding material cannot develop the mechanical strength based on the theory of additivity law. FIG. 6 is a graph showing how the mechanical strength varies with increasing proportion of the carbon fibers (A) and decreasing proportion of the carbon fibers (B) under a condition that the volume percentage of all fibers incorporated into the molding material is constant.

According to the theory of additivity law, the bending strength S is expressed by the equation $S=qSa+(1-q)Sb$ and indicates a linear graph as drawn by a broken line shown e.g. in FIG. 6. In ordinary cases, however, it does not occur that a mechanical strength is plotted on the graph shown by the broken line, and the mechanical strength falls below the value based on the theory of additivity law. As to the bending strength as one of mechanical strengths, a range beyond values following the theory of additivity law is present in molding materials according to the invention.

Reasons for the presence of such a range are uncertain, but it is presumed that the carbon fibers (A) and thermoplastic resin behave together as reinforcing matrix resin, and they are homogenously present in interstices formed by the carbon fibers (B) including fiber bundles and single fibers. With this being the situation, even when the carbon fibers (B) content is reduced, there is a range in which the bending strength has a value obtained by multiplying the theoretical value of the theory of additivity law by a factor of 0.8 or greater, or it has a value equivalent to the theoretical value of the theory of additivity law or greater. This finding indicates that molding materials according to the invention have effect of deviating from hitherto considered general behaviors of molding materials.

In addition, according to our inference, it is thought that, when the carbon fibers (B) incorporated in the molding material have un-impregnated portions, addition of relatively short carbon fibers (A) and reduction in the content of relatively long carbon fibers (B) under a condition of keeping the volume proportion of all carbon fibers at constant allow enhancement of the ability of the carbon fibers (B) to be impregnated with a thermoplastic resin to result in development of a physical property exceeding the theory of additivity law by a factor of 0.8 or greater.

Figure 7:
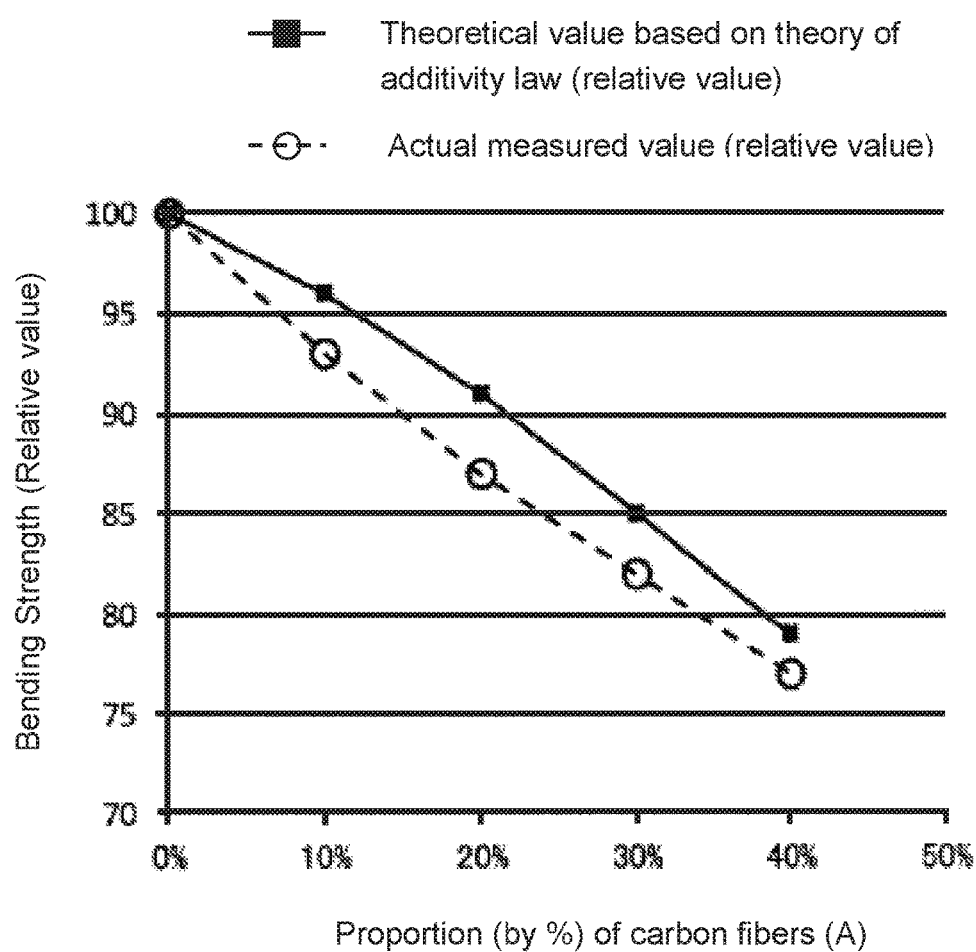
FIG. 7 is a diagram in which relations between bending strength and proportion of carbon fibers (A) to the total of carbon fibers (A) and carbon fibers (B) are displayed graphically based on the data from Examples and Comparative Examples, respectively.

Additionally, in FIG. 7, the graph of bending strength is drawn in a range exceeding theoretical values based on the theory of additivity law by a factor of 1.0 or greater. However, it is assumed that, when the proportion of carbon fibers (A) is made higher, there will be present a range in which the bending strength is below the theoretical values based on the theory of additivity law as shown in FIG. 7.

The effect mentioned above is markedly produced especially when, though the carbon fibers (B) are in a state of being partially opened and the interior of bundles therein is therefore difficult to impregnate with a thermoplastic resin, an apparent increase in proportion of the thermoplastic resin can be imitated by increasing the proportion of the carbon fibers (A) to result in creation of such fiber forms as to advance the impregnation with a thermoplastic resin.

In contrast to the above case, when the proportion of the carbon fiber bundles (B1) to the total carbon fibers (B) is 100%, it is difficult to achieve a great improvement in impregnation of the interior of the carbon fiber bundles (B1) with a thermoplastic resin even by increasing the proportion of the carbon fibers (A), and hence it is thought that the bending strength will fall below 80% of the theoretical value based on the theory of additivity law.

From the viewpoint of attaining a 0.8-fold or more increase in an S value expressed by $qSa+(1-q)Sb$, it is appropriate for a carbon fiber reinforced molding material to satisfy the following conditions 1) to 3):

1) carbon fibers (B) include fiber bundles of such a type that the number of fibers constituting each bundle is smaller than the critical number of single fiber defined by the following expression (1), single fibers and carbon fiber bundles (B1) of such a type that the number of carbon fibers constituting each bundle is larger than the critical number of single fiber, 2) a proportion of the carbon fiber bundles (B1) is from 5 vol % to less than 95 vol % with respect to the total volume of the carbon fibers (B) in the carbon fiber reinforced molding material, and 3) an average fiber number ($N_B$) in the carbon fiber bundles (B1) satisfies the following relation (2);

$$\text{Critical number of single fiber} = 600/D_B \tag{1}$$

$$0.43 \times 10^4/D_B^2 < N_B < 6 \times 10^5/D_B^2 \tag{2}$$

where $D_B$ is an average fiber diameter (μm) of single carbon fibers (B).

Likewise, this theory of additivity law can also be applied to a shaped product.

More specifically, it is appropriate for the shaped product to have its bending strength S, one of its mechanical strengths, in a range that the relation $S \geq (qSa+(1-q)Sb) \times 0.8$ holds.

Herein,

Sa: bending strength of the shaped product (A) consisting of the carbon fibers (A) and the thermoplastic resin, Sb: bending strength of the shaped product (B) consisting of the carbon fibers (B) and the thermoplastic resin, and q: weight ratio of the carbon fibers (A) content to the total content of the carbon fibers (A) and the carbon fibers (B).

The appropriate bending strength S is preferably in a range of $(qSa+(1-q)Sb) \times 0.9$ or more, far preferably in a range of $(qSa+(1-q)Sb) \times 1.0$ or more, further preferably in a range of a value obtained by multiplying $(qSa+(1-q)Sb)$ by a factor beyond 1.0 (namely $S > qSa+(1-q)Sb$).

[Other Reinforcing Fibers]

In addition to the carbon fibers (A) and the carbon fibers (B), other reinforcing fibers, such as glass fibers, aramid fibers and other carbon fibers, may be added to the molding material within the bounds of not impairing the objects of the invention. To be specific, these fibers may be present, irrespective of fiber length and opening degree, in a proportion of 0 weight % to 49 weight % with respect to all the reinforcing fibers incorporated into the molding material.

[Thermoplastic Resin]

Examples of a thermoplastic resin used in the molding material include polyolefin resin, polystyrene resin, thermoplastic polyamide resin, polyester resin, polyacetal resin (polyoxymethylene resin), polycarbonate resin, (meth)acrylate resin, polyarylate resin, polyphenylene ether resin, polyimide resin, polyether nitrile resin, phenoxy resin, polyphenylene sulfide resin, polysulfone resin, polyketone resin, polyether ketone resin, thermoplastic urethane resin, fluorocarbon resin, and thermoplastic polybenzoimidazole resin.

Examples of the polyolefin resin can include polyethylene resin, polypropylene resin, polybutadiene resin, polymethylpentene resin, vinyl chloride resin, vinylidene chloride resin, vinyl acetate resin and polyvinyl alcohol resin.

Examples of the polystyrene resin can include polystyrene resin, acrylonitrile-styrene resin (AS resin) and acrylonitrile-butadiene-styrene resin (ABS resin).

Examples of the polyamide resin can include polyamide 6 resin (nylon 6), polyamide 11 resin (nylon 11), polyamide 12 resin (nylon 12), polyamide 46 resin (nylon 46), polyamide 66 resin (nylon 66) and polyamide 610 resin (nylon 610).

Examples of the polyester resin can include polyethylene terephthalate resin, polyethylene naphthalate resin, polybutylene terephthalate resin, polytrimethylene terephthalate resin and liquid crystal polyester.

An example of the (meth)acrylate resin can be polymethyl methacrylate.

Examples of the polyphenylene ether resin can be modified polyphenylene ethers.

Examples of the thermoplastic polyimide resin can include thermoplastic polyimide, polyamide-imide resin and polyamide ether resin.

Examples of the polysulfone resin can include modified polysulfone resins and polyether sulfone resin.

Examples of the polyether ketone resin can include polyether ketone resin, polyether ether ketone resin and polyether ketone ketone resin.

An example of the fluorocarbon resin can be polytetrafluoroethylene.

In the molding material, only one kind of thermoplastic resin may be used, or two or more kinds of thermoplastic resins may be used. Examples of a form of using two or more kinds of thermoplastic resins in combination include but not limited to the form of using a combination of thermoplastic resins mutually different in softening temperature or melting temperature and the form of using a combination of thermoplastic resins mutually different in average molecular weight.

[Other Agents]

The molding material may include various fibrous or non-fibrous fillers, such as glass fibers and organic fibers, and other additives, such as flame retardant, a UV-resisting agent, a pigment, a parting agent, a softening agent, a plasticizer and a surface active agent, so long as they have no detrimental effect on the objects of the invention.

<<Shaped Product>>

The shaped product as an embodiment of the invention is a shaped product formed with a carbon fiber reinforced molding material, and the carbon fiber reinforced molding material is the above-defined carbon fiber reinforced molding material wherein, when the plate thickness in an area smallest in plate thickness of the shaped product is defined as a minimum plate thickness T (mm), (a) a number-average fiber length $L_{nA}$ of the carbon fibers (A) is shorter than T/2 (mm), and (b) a number-average fiber length $L_{nB}$ of the carbon fibers (B) is longer than T (mm).

By the way, as to the minimum plate thickness T defined herein, burrs left on a shaped product at the time of molding of the molding material are not regarded as a portion of the shaped product, and hence they are not a subject of the minimum plate thickness.

In addition, the shaped product as an embodiment of the invention is a shaped product formed with a carbon fiber reinforced molding material, and the carbon fiber reinforced molding material is the above-defined carbon fiber reinforced molding material wherein, when a cross section in the plate thickness direction is observed, an area proportion of the carbon fiber bundles (A1) defined below is from higher than 0% to 50% with respect to the total carbon fibers (A). Herein, the carbon fiber bundles (A1) are derived from the carbon fibers (A) and are carbon fiber bundles each of which can be observed when the number of fibers therein is at least $35/D_A$ where $D_A$ is an average fiber diameter (μm) of the carbon fibers (A).

[Characteristics]

In the shaped product formed with the forgoing molding material, fiber characteristics of the carbon fibers (A) and the carbon fibers (B) present in the molding material, such as fiber lengths and fiber bundles, are retained on the almost same level. In general, a plate-shaped molding material is used as it is, and formed into a plate-shaped shaped product. Meanwhile, the plate-shaped shaped product is a product in a shape having a flat-shaped portion, and thereon ribs or/and bosses may be or may not be formed.

The plate-shaped molding material does not mean that it is used for making shaped products, e.g. resin pellets as disclosed in JP-A-2011-57811, by usually providing the melt-kneading process using a screw. The plate-shaped molding material in the invention is mainly used for press forming, and therein there are no changes in fiber characteristics of the carbon fibers (A) and the carbon fibers (B). Preferred plate-shaped molding materials have sizes of 50 mm×50 mm or greater in XY directions.

[Minimum Plate Thickness of Shaped Product]

Shaped products formed with the molding material can be adjusted to have different plate thicknesses according to their uses. The plate thickness of each shaped product may be almost the same as that of the molding material, or may be thinner than that of the molding material. The plate thickness of the shaped product becomes the same as that of the molding material when the mold used at the time of forming is a closed-type mold, while the plate thickness becomes thinner than that of the molding material when the mold used is an opened-type mold. Meanwhile, formable materials are suitable for the compression molding using a closed-type mold.

The plate thickness of the shaped product may be in a range of 0.2 mm to 5 mm, and can be adjusted appropriately to such a thin article as 3 mm or below.

In addition, the minimum plate thickness of a shaped product formed with the molding material has no particular limits, but it is preferably 1 mm or above. This value is chosen from the viewpoint of ensuring flowability at the time of molding, and as far as the minimum plate thickness is 1 mm or above the flowability at the time of molding becomes good.

[Relationship Between Number-Average Fiber Length $Ln_A$ and Plate Thickness]

When the minimum plate thickness of the shaped product is represented by T (mm), it is appropriate that the number-average fiber length $Ln_A$ of the carbon fibers (A) be shorter than T/2 (mm). This is because, though longer fiber lengths are the more desirable for the purpose of developing the reinforcing effect by fibers, the carbon fibers (A) are not likely to be a factor responsible for hindrance to the flow in the flow process of molding so long as the number-average fiber length $Ln_A$ is shorter than T/2 (mm). The preferred number-average fiber length $Ln_A$ is shorter than T/3 (mm).

[Area Proportion of Carbon Fiber Bundles (A1)]

At the time of observation of cross sections of the shaped product in the plate-thickness direction (e.g. in the Z direction in FIG. 5), it is appropriate for the shaped product to contain the carbon fiber bundles (A1) defined above in such a proportion that the area of the carbon fiber bundles (A1) constitutes larger than 0% to 50% of the total area of the carbon fibers (A).

When the proportion of the area of the carbon fiber bundles (A1) to the total area of the carbon fibers (A) is 50% or lower, carbon fibers in single-fiber form are present in large numbers, and hence it becomes easy to ensure mechanical strengths, notably bending strength. The proportion of the area of the carbon fiber bundles (A1) to the total area of the carbon fibers (A) is preferably in a range of larger than 0% to 30%, far preferably in a range of larger than 0% to 15%.

By allowing the carbon fiber bundles (A1) each of which is composed of at least a specified number of carbon fibers to co-reside with opened carbon fibers or other carbon fiber bundles in a specified proportion, it becomes possible to increase the amount of the carbon fibers (A) present in the shaped product, namely the fiber volume fraction Vf (unit: Vol %) of the carbon fibers (A).

[Number-Average Fiber Length $Ln_B$]

In the shaped product, the number-average fiber length of carbon fibers (B), $Ln_B$, has no particular limits, but it is appropriate that, when the minimum plate thickness of the shaped product is represented by T (mm), the number-average fiber length $Ln_B$ be T (mm) or greater. As to the fiber lengths, for the purpose of allowing reinforcing effect of fibers to develop, the fibers longer in the number-average fiber length $Ln_B$ are the more desirable, while the number-average fiber length $Ln_B$ below T (mm) causes alignment of the carbon fibers in the plate-thickness direction of the shaped product at the time of molding flow and becomes a factor responsible for the lowering of flowability. The number-average fiber length $Ln_B$ is preferably two times or more, far preferably 5 times or more, the minimum plate thickness T (mm) of the shaped product.

The upper limit of the number-average fiber length $Ln_B$ has no particular restrictions, but it is preferably 50 mm or below, far preferably 20 mm or below, from the viewpoint of retaining flowability.

<<Manufacturing Method of Molding Material>>

The manufacturing method of the molding material is not particularly restricted, but the molding material is preferably manufactured e.g. through the following processes 1 to 5.

FIG. 1 is a schematic diagram showing the following processes 2 to 4.

Process 1: Process for preparing resin powder (P) containing the carbon fibers (A)

Process 2: Process for obtaining the carbon fibers (B) by cutting carbon fibers

Process 3: Process of opening the cut carbon fibers (B)

Process 4: Process of obtaining a precursor of the molding material (simply referred to as "a precursor" hereafter) by spraying the opened carbon fibers (B) and the resin powder (P) prepared in the process 1

Process 5: Process of obtaining the molding material by subjecting the precursor to heating compression Meanwhile, as shown in FIG. 1, carbon fibers subjected to the process 2 and afterward are symbolized by "1", and the process 2 is carried out using e.g. a cutting device 3, the process 3 is carried out using e.g. an opening device 5 and the process 4 is carried out using e.g. a spraying device 7.

Each process is described below in detail.

[Process 1]

For the purpose of preparing the carbon fibers (A) having the composition mentioned above, it is appropriate to prepare the resin powder (P). More specifically, it is appropriate to prepare resin powder (P) containing such carbon fibers (A) as to include a large number of fibers of single-fiber form and allow the forming of a shaped product wherein, when a cross section in the plate thickness direction is observed, the area proportion of the carbon fiber bundles (A1) each of which can be observed when the number of fibers therein is at least $35/D_A$ is from higher than 0% to 50% with respect to the total carbon fibers (A).

To begin with, resin pellets are obtained by mixing a granular material (R) with a thermoplastic resin (neat resin), subjecting the resulting mixture to melt-kneading, and then charging the melt-kneaded matter into an extruding machine.

As the granular material (R) herein, as mentioned above, commercially available carbon fiber resin pellets, pulverized materials or so on are preferably utilized.

The mixing ratio between the granular material (R) and the thermoplastic resin (neat resin) has no particular limits, but from the viewpoint of manufacturing a molding material having an appropriate fiber volume fraction Vf of carbon fibers through the mixing with carbon fibers (B) mentioned hereafter, it is appropriate that the fiber volume fraction Vf in the resin pellets be adjusted to fall within a range of 1% to 70%, preferably a range of 1% to 40%, far preferably a range of 1% to 20%.

When the resin pellets obtained are pulverized with a pulverizer, pulverized resin powder (P) and resin lumps in massive form can be obtained. The sizes of the resin powder (P) and the resin lumps have no particular limits, but in terms of mechanical properties the sizes are preferably at least 1 mm per side, far preferably at least 2 mm per side. The upper size limits of the resin powder (P) and the resin lumps, though it depends on the size of a feeder as mentioned below, are preferably at most 4 mm per side, far preferably at most 3 mm per side. The shapes of the resin powder (P) and the resin lumps usually become indefinite shape during the pulverizing process. Meanwhile, the difference between the resin powder (P) and the resin lumps is generally unclear, and the resin powder (P) is on the whole smaller than the resin lumps.

[Process 2]

This process is a process of cutting carbon fibers. In the case of incorporating carbon fibers (B) into the molding material within the range of exerting no influence on the compositional ratio between the carbon fibers (A) and the carbon fibers (B), two or more cutting devices may be prepared for the process of cutting carbon fibers 1 to obtain the carbon fibers (B), and fiber groups cut using the respective devices may be mixed together by the use of the opening device.

Further, in the case of adjusting the $Lw_B/Ln_B$ of the carbon fibers (B) incorporated into the molding material to have a distribution in a range of 1.0 to less than 1.2, it is possible to cut carbon fibers e.g. so as to continuously change the length of cut fibers by the use of a rotary cutter which is continuously changed in the pitch of its blade, or so as to discontinuously change the length of cut fibers by the use of a rotary cutter which is changed stepwise in the pitch of its blade.

[Process 3]

The process 3 is an opening process for opening the carbon fibers (B) cut in the process 2. The opening process is a process of admitting the cut carbon fibers (B) into a tube 21 and making fiber bundles open. The fiber bundles can be opened as appropriate by blowing air on the fiber. The opening degree, the proportion of the carbon fiber bundles (B1) in the carbon fibers (B) and the average fiber number ($N_B$) in the carbon fiber bundles (B1) can be adjusted as appropriate by controlling the pressure of air and so on.

[Process 4]

The process 4 is a precursor forming process for forming a precursor of a molding material including the opened carbon fibers (B) and the resin powder (P). Under the precursor forming process, concurrently with spraying the cut-and-opened carbon fibers (B) into air, the resin powder (P) obtained under the process 1 is fed, and the carbon fibers (B), together with the resin powder (P), are sprayed on a support 31, thereby forming a precursor 33 for a mat-form molding material.

In FIG. 1, the carbon fibers (B) are symbolized by "B", and the resin powder (P) is symbolized by "P". By the way, the resin powder (P) is fed from e.g. a powder feeding device 35 shown in FIG. 1.

Herein, a breathable material is used as the support 31, and both the carbon fibers (B) and the resin powder (P) sprayed on the support 31 are deposited on and fixed to the support 31 by suction from under the support.

During this process, the carbon fibers (B) made to open by air (gas) and the resin powder (P) fed from a different path can be concurrently sprayed toward the surface of the support 31, deposited on the support 31 in a state that they are almost homogeneously mixed together and form a mat, and fixed in such a state. At this time, it is possible to continuously producing a precursor 33 by depositing both the carbon fibers (B) and the resin powder (P) on the support 31 of e.g. a net-made conveyer while continuously moving the support 31 in one direction. Alternatively, homogeneous deposition of the carbon fibers (B) and the resin powder (P) may be performed by moving the support 31 in forward/backward and right/left directions.

Herein, the carbon fibers (B) are sprayed so that they are two-dimensionally randomly oriented. In order to spray the opened fibers while making them two-dimensionally randomly orient, it is appropriate to use e.g. a tapered tube 37 of a conical form broadening toward the downstream side. In the interior of the tapered tube 37, there occurs diffusion of the gas blown on carbon fibers for the opening purpose and the velocity of gas flow in the tube is reduced, and thereby rotational force is given to the carbon fibers. The utilization of this Venturi effect allows homogeneous spraying of the opened carbon fibers (B) together with the resin powder (P), without unevenness. Under this process, it is appropriate for the resin powder (P) to be sprayed so that the resin fibers (A) are three-dimensionally randomly oriented.

It is appropriate that the feed amount of the resin powder (P) be from 10 parts by weight to 1,000 parts by weight, preferably from 50 parts by weight to 400 parts by weight, far preferably from 80 parts by weight to 150 parts by weight, with respect to 100 parts by weight of the carbon fibers (B). In addition, a thermoplastic resin (neat resin) may be fed at the same time separately from the feed of the resin powder (P).

[Process 5]

This process is a process of obtaining a molding material by heating and pressurizing the precursor 33 obtained by the process 4. It is needless to say that the molding material contains the thermoplastic resin, the carbon fibers (A) and the carbon fibers (B).

Figure 4:
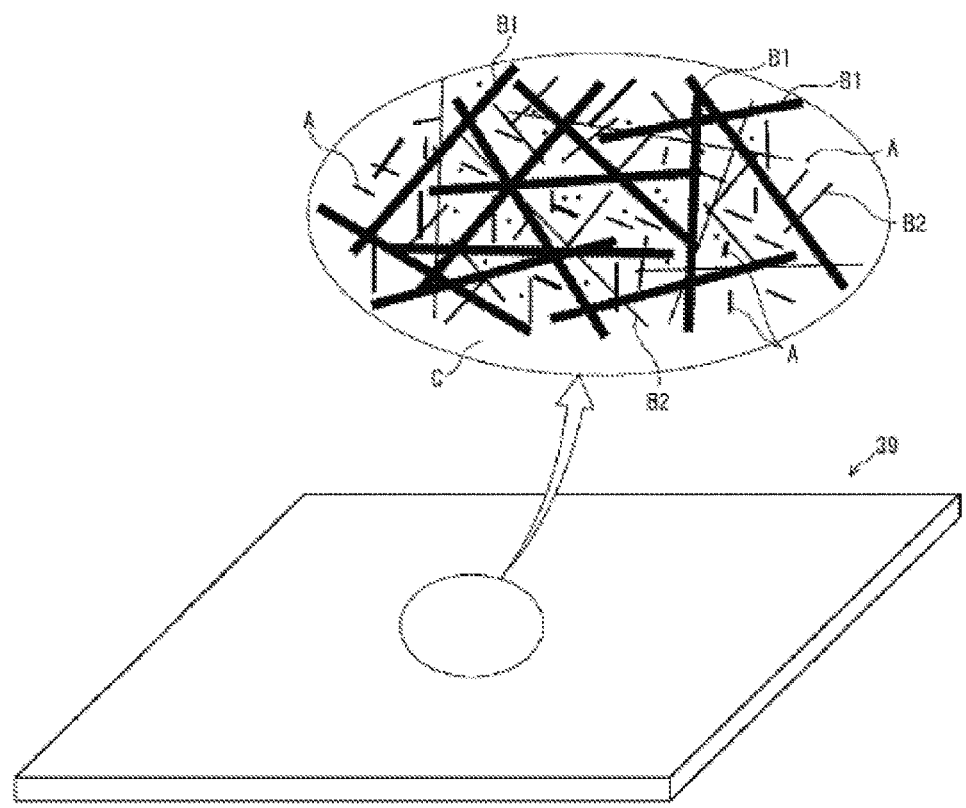
FIG. 4 shows an example of a molding material and a schematic diagram of its surface under observation.

An example of the molding material is schematically shown in FIG. 4. In FIG. 4, the molding material 39 contains the thermoplastic resin, the carbon fibers (A) and the carbon fibers (B), and the thermoplastic resin is symbolized by "C", the carbon fibers (A) are symbolized by "A", the carbon fiber bundles (B1) of the carbon fibers (B) are symbolized by "B1" and the single fibers or the like (B2) of the carbon fibers (B) are symbolized by "B2".

Herein, the heating and pressurization, though may be carried out separately, can be preferably performed using e.g. a press forming and/or heat forming method.

The precursor 33 has a feature that it is easily impregnated with the thermoplastic resin because of even spraying of the resin powder (P) among the carbon fibers (B), and hence the molding material can be obtained with efficiency from the precursor 33 by the use of e.g. hot press forming method.

As to the condition for pressurization, it is appropriate that the pressure applied to the precursor 33 at the time of obtaining the molding material be lower than 10 MPa, preferably 8 MPa or lower, far preferably 5 MPa or lower. When the pressure is lower than 10 MPa, cheaper or usual forming devices (press devices) can be adopted, and such low pressure is favorable also in the case of producing big precursors because it allows reduction in capital investment and maintenance costs.

As to the temperature at the time when the precursor 33 is heated in order to make the precursor 33 into a molding material, it is appropriate that the temperature be from the melting temperature to lower than the decomposition temperature of thermoplastic resin when the thermoplastic resin in the precursor 33 is crystalline, while it be from glass transition temperature to lower than the decomposition temperature of thermoplastic resin when the thermoplastic resin in the precursor 33 is amorphous. Additionally, the decomposition temperature of thermoplastic resin is preferably a temperature at the time of decomposition of the thermoplastic resin in the air.

The molding material obtained through the foregoing processes is useful for three-dimensional forming to provide products having e.g. ribs and bosses, notably for press forming.

<<Molding Method of Molding Material>>

In molding the molding material, various molding methods can be used, but the molding is preferably performed under conditions of heating and pressurizing.

As the molding method, compression molding methods, such as the so-called cold press or hot press method, can be favorably utilized.

[Cold Press Method]

In the cold press method, a molding material heated up to a first specified temperature is inserted into a mold adjusted to a second temperature, and then pressurized and cooled.

To be specific, when the thermoplastic resin included in the molding material is crystalline, the first specified temperature is the melting temperature or higher and the second specified temperature is lower than the melting temperature. When the thermoplastic resin is amorphous, the first specified temperature is the glass transition temperature or higher and the second specified temperature is lower than the glass transition temperature.

More specifically, the cold press method includes at least the following steps A-1) and A-2).

A-1): Step of heating the molding material up to a temperature in a range of the melting temperature to decomposition temperature of thermoplastic resin when the resin is crystalline, while in a range of the glass transition temperature to decomposition temperature of the resin when the resin is amorphous.

A-2): Step of placing the molding material heated in the step A-1) in a mold adjusted to a temperature lower than the melting temperature of thermoplastic resin when the resin is crystalline, while a temperature lower than the glass transition temperature of thermoplastic resin when the resin is amorphous, and applying pressure to the mold.

By carrying out these steps, the molding of the molding material can be completed.

Incidentally, at the occasion of placement in a mold, one or more than one sheet of molding material can be used to suit the plate thickness of a target shaped product. In the case of using two or more sheets of molding material, the sheets layered in advanced may be heated, or a layered body of the heated sheets may be placed in a mold, or the heated sheets may be placed in a mold one by one. Meanwhile, in the case of layering two or more sheets of molding material, the smaller a difference in temperature between the bottom sheet and the top sheet is preferable. From this point of view, the layering of sheets is preferably carried out before placing the sheets in a mold.

In addition, for application of pressure in the step A-1), a mold, a nip roller or the like can be utilized. Although it is necessary for the foregoing steps to be carried out in the order of mention, another step may be provided between those steps. As an example of such a step, mention may be made of a forming step wherein the cavity of a mold to be used in the step A-2) is shaped in advance of the step A-2) by the use of a forming mold other than the mold in the step A-2).

[Hot Press Method]

In a hot press method, a molding material is inserted in a mold and pressurized as the temperature of the mold is raised up to a first specified temperature, and then cooled down to a second specified temperature.

To be more specific, when the thermoplastic resin included in the molding material is crystalline, the first specified temperature is the melting temperature or higher and the second specified temperature is lower than the melting temperature. When the thermoplastic resin is amorphous, the first specified temperature is the glass transition temperature or higher and the second specified temperature is lower than the glass transition temperature.

It is appropriate for the hot press method to include at least the following steps B-1) and B-4).

B-1): Step of placing the molding material in a mold.

B-2): Step of pressurizing the mold while raising the mold temperature up to a temperature in a range of the melting temperature to decomposition temperature of thermoplastic resin when the resin is crystalline, or a temperature in a range of the glass transition temperature to decomposition temperature of thermoplastic resin when the resin is amorphous (First press step).

B-3): Step of pressurizing the mold in one or more stages so that the pressure at the last stage becomes 1.2 to 100 times as high as the pressure in the first press step (Second press step).

B-4): Step of adjusting the mold to have a temperature lower than the melting temperature of thermoplastic resin when the resin is crystalline, or a temperature lower than the glass transition temperature of thermoplastic resin when the resin is amorphous.

By performing these steps, molding of the molding material cam be completed.

[Common Things]

Each of the step A-2) and the step B-3) is a step of obtaining a shaped product with an intended shape by applying pressure to the molding material, and the molding pressure at this time has no particular limits. However, it is appropriate that the molding pressure be lower than 10 MPa with respect to the projection area of a cavity in the mold, preferably lower than 8 MPa, far preferably lower than 5 MPa.

The molding pressure of 10 MPa or higher is undesirable because it requires a lot of capital investment and maintenance costs for forming big shaped product in particular. The molding material described above is high in flowability during the molding, and hence ribs and bosses can be provided consistently even when the molding pressure is lowered.

Further, the use of the molding material makes it possible to easily provide ribs even when the ribs to be provided are large ribs difficult to form consistently. Both the compression molding methods are applicable to the molding of the molding material, but from the viewpoint of allowing more reduction in molding time, the cold press method is preferred.

And, as a matter of course, various steps may be inserted between the foregoing steps under the compression molding. For example, vacuum compression molding performed as the compression molding is carried out under vacuum may be adopted.

EXAMPLES

Examples are illustrated below, but the invention should not be construed as being limited to these examples in any way.

Calculation and evaluation methods of physical properties and so on in Examples and Comparative Examples are explained below.

[Method for Measuring Fiber Lengths of Carbon Fibers Incorporated into Molding Material or Shaped Product]

In Examples mentioned below, carbon fibers are cut with a rotary cutter in the process 2 so that the fiber lengths of carbon fibers (A) incorporated into resin powder (P) are adjusted to fall in a range of 0.01 mm to below 3 mm and those of the carbon fibers (B) are adjusted to fall in a range of 3 mm to below 100 mm.

To be more specific, in Examples according to the invention, characteristics of the carbon fibers (A) incorporated into the resin powder (P) are retained in the fiber lengths and the fiber length distribution of the carbon fibers (A) incorporated into the precursor, the molding material and the shaped product.

On the other hand, characteristics of the carbon fibers (B) incorporated in the precursor are retained in the fiber lengths and the fiber length distribution of the carbon fibers (B) incorporated into the molding material and the shaped product. Accordingly, characteristics of the carbon fibers (A) were examined through the analysis of carbon fibers incorporated into the resin powder (P), and those of the carbon fibers (B) were examined through the analysis of carbon fibers which were incorporated into the precursor and had lengths in a range of 3 mm to below 100 mm.

To be concrete, the resin powder (P) obtained or the precursors cut into pieces were put in a crucible, and heated at 550° C. for 1.5 hours in an atmosphere containing oxygen to result in removal of the resin component by combustion. The carbon fibers left after combustion were charged into surfactant-containing water, and stirred to a sufficient degree by means of ultrasonic vibration. Evaluation samples were taken randomly from the stirred dispersion by means of a measuring spoon, and lengths of 3,000 carbon fibers were measured with an image analysis instrument Luzex AP made by NIRECO.

In the case of analyzing the precursor, the measured lengths of all carbon fibers (Li) were classified into two groups, a group of lengths of carbon fibers (A) ranging from 0.01 mm to below 3 mm and a group of lengths of carbon fibers (B) ranging from 3 mm to below 100 mm.

As to the extracted carbon fibers, the number-average fiber length Ln and weight-average fiber length Lw of the carbon fibers (A) and those of the carbon fibers (B) were calculated individually from the expressions (3) and (4), respectively, and the width of fiber length distribution, Lw/Ln, of the carbon fibers (A) and that of the carbon fibers (B) were determined individually.

Additionally, no resin powder (P) was prepared in some of Examples and some of Comparative Examples. Therein, characteristics of fibers incorporated into pulverized materials used instead of the resin powder (P) were analyzed in the same manner as mentioned above.

[Analysis of Carbon Fiber Bundles in Molding Material]

Analyses of carbon fiber bundles of the above-classified carbon fibers (A) and carbon fibers (B) were made in the following manner.

1. Analysis of Fiber Bundles Included in Carbon Fibers (A)

Carbon fiber sections appearing in ten spots each having an area of 10 mm×10 mm and being arbitrarily chosen in the thickness direction of a plate-shaped molding material 39 (the Z direction in FIG. 5) were observed, and whether the carbon fibers were in a form of bundles or in a form of single fibers was ascertained. Incidentally, the carbon fiber sections appearing in the plate-thickness direction refers to the sections of carbon fibers appearing in a plane orthogonal to the plate-thickness direction, and are e.g. planes parallel to XY planes in FIG. 5 and include a principal plane on the front side (front surface) and a principal plane on the back side (rear surface).

The distribution of carbon fiber bundles is evaluated by the following criteria.

A (perfect): Area proportion of the carbon fiber bundles (A1) to the total carbon fibers (A) is from 0% to lower than 15%

B (excellent): Area proportion of the carbon fiber bundles (A1) to the total carbon fibers (A) is from 15% to lower than 50%

C (good): Area proportion of the carbon fiber bundles (A1) to the total carbon fibers (A) is 50% or higher Incidentally, as mentioned above, the carbon fiber bundles (A1) belong to the carbon fibers (A) and are carbon fiber bundles each of which is observed when the number of fibers therein is at least $35/D_A$ (where $D_A$ is an average fiber diameter (μm) of single carbon fibers (A)).

2. Analysis of Fiber Bundles Included in Carbon Fibers (B)

All of fiber bundles having their fiber lengths in a range of 3 mm to shorter than 100 mm are picked out with tweezers, and the bundle number I of the fiber bundles (B1), the length of each fiber bundle $L_Bi$ and the mass of each fiber bundle $W_Bi$ are measured and recorded. Where fiber bundles too small in size to be picked out with tweezers are concerned, mass measurement is made finally on them together (the mass obtained by this measurement is represented by $W_Bk$).

The mass measurement is carried out by means of a balance measurable down to 1/100 mg. From the average fiber diameter $D_B$ of the carbon fibers (B) incorporated into a molding material 39, the critical number of single fiber is calculated on the basis of the foregoing expression (1), and the carbon fibers (B) are separated into the carbon fiber bundles (B1) each having a single-fiber number equal to or greater than the critical number of single fiber and others (B2) including single fibers and so on.

The way to determine the average fiber number of the carbon bundles (B1), $N_B$, is as follows.

The number of fibers in each carbon fiber bundle, $N_Bi$, is determined from the fineness $F_B$ of the carbon fibers (B) in use according to the following expression (5).

$$N_Bi = W_Bi/(L_Bi \times F_B) \quad (5)$$

The average fiber number $N_B$ in the carbon fiber bundles (B1) is determined from the bundle number I of the carbon fiber bundles (B1) according to the following expression (6).

$$N_B = \Sigma N_Bi/I \quad (6)$$

The proportion of the carbon fiber bundles (B1) to the total volume of the carbon fibers (B), $VR_B$, is determined using the density ($\rho_B$) and according to the following expression (7).

$$VR_B = \Sigma(W_Bi/\rho_B) \times 100/((W_Bk + \Sigma W_Bi)/\rho_B) \quad (7)$$

3. Analysis of Three-Dimensional Orientation of Carbon Fibers (A) in Molding Material In Examples and Comparative Examples, random orientation of the carbon fibers (A) in three-dimensional directions is measured under the following procedures.

(i) In order to make it possible to easily observe carbon fiber sections, 10 cubes each having a size of 2 mm (length)×2 mm (width)×2 mm (thickness) are cut from of a molding material 39 in the form of a rectangular solid having a size of 20 mm (length)×20 mm (width)×3 mm (thickness), 10 spots in each face of each cube are observed individually and a count of carbon fiber sections in each of the observed spots is taken, and then the average of these counts is calculated. On the occasion when the cubes are cut from a plate-shaped molding material 39, the surface (6 faces) of the molding material is whittled down by about 200 μm by machining in order to remove the surface resin.

(ii) In each of the top, the bottom and the 4 sides, the 6 faces in total, of a molding material (B) made separately of carbon fibers (B) alone ranging from 3 mm to shorter than 100 mm in fiber length (corresponding to Comparative Example 3 described hereinafter), section count of carbon fibers (B) observed per unit area is taken in the same manner as in (i).

(iii) With respect to the section count taken under observation of each face, the section count taken under observation in (i) is subtracted from the section count taken under observation in (ii).

(iv) The section count after the subtraction is defined as follows, and ((X+Y)/2)/Z is calculated and evaluated on the following criteria. Incidentally, the wording "a lateral face in the A direction" refers to the face in a state of being parallel to a plane orthogonal to the A direction.

X: Section count of carbon fibers (A) per unit area (1 mm×1 mm) under observation of a lateral face in the X direction (a face parallel to the YZ plane) shown in FIG. 5

Y: Section count of carbon fibers (A) per unit area (1 mm×1 mm) under observation of a lateral face in the Y direction (a face parallel to the XZ plane) shown in FIG. 5

Z: Section count of carbon fibers (A) per unit area under observation of a face in the plate thickness direction (a lateral face in the Z direction shown in FIG. 5, and a face parallel to the XY plane)

The index of evaluation of randomness of the carbon fibers (A) in three directions is as follows.
 A (excellent): 1≤((X+Y)/2)/Z<2
 B (good): 2≤((X+Y)/2)/Z<10
 C (bad): 10≤((X+Y)/2)/Z
4. Analysis of Two-Dimensional Orientation of Carbon Fibers (B) in Molding Material Test specimens are cut from the molding material 39, and thereon tensile modulus measurements are made with respect to an arbitrary direction (0-degree direction) and the direction orthogonal thereto (90-degree direction) in the molding material, and the ratio Eδ, a value obtained by dividing great one by small one of the tensile moduli measured, is determined. The closer to 1 the modulus ratio is, the more excellent the material is in isotropy. In Examples, materials having modulus ratios of 1.3 or lower are regarded as having excellent isotropy. Incidentally, the index of evaluation of randomness of the carbon fibers (B) in two-dimensional directions is as follows. In the following, a case rated as A indicates that the carbon fibers (B) are two-dimensionally randomly oriented, while a case rated as B indicates that the carbon fibers (B) are not two-dimensionally randomly oriented.
 A (good): Eδ≤1.3
 B (bad): 1.3<Eδ
5. Analysis of Fiber Volume Fraction A square plate measuring 100 mm×100 mm in size was cut from the molding material 39, and the weight thereof, w0 (g), was measured. Then, the cut molding material was heated in the air at 500° C. for 1 hour, and thereby the resin component was burnt away. The weight of the remaining carbon fibers, wl (g), was measured. By the use of the measurement results and the following expression (8), the fiber weight fraction wf was determined. Every measurement was made under a condition of n=3, and an average value therefrom was calculated.

Fiber weight fraction=(carbon fiber weight $wl$/molding material weight $w\theta$)×100        (8)

Next, the density of each component was used and the fiber volume fraction Vf was calculated according to the following expression (9). Here, the following relation (9) is generally held between the fiber volume fraction Vf and the fiber weight fraction wf.

$1/Vf=1+\rho f(1/wf-1)/\rho m$        (9)

Herein, ρf is the fiber density and ρm is the resin density.
[Evaluation in Shaped Product]
1. Evaluation of Physical Property A test specimen is cut from an horizontal portion of a shaped product by means of a jet of water, and with JIS K7074 as a guide, the test specimen was subjected to measurement with a bending tester 5966 made by Instron. Herein, the test specimen was shaped into an A-type specimen. The ratio between a gauge length and a plate thickness (L/D) was adjusted to 40 and the test speed was adjusted to 1%/min.

By measuring a bending stress in the foregoing manner, influences of a variation in plate thickness of the test specimen upon the value of bending stress were made negligible. Additionally, the evaluation result of bending stress was described as a relative value, with Comparative Example 2 being taken as 100.

Likewise, tensile stress was also measured by cutting a test specimen from a shaped product by means of a jet of water and subjecting the test specimen to measurement with a universal tester 5982R4407 made by Instron with JIS K7164 as a guide. Herein, the test specimen was shaped into an A-type specimen. The distance between chucks was adjusted to 115 mm, and the test speed was adjusted to 2 mm/min. Meanwhile, the tensile test result was utilized for evaluation of the condition of two-dimensional orientation and so on.
2. Evaluation of Capability of Filling in Boss and Rib For the purpose of evaluating the flowability and formability of the molding material 39, visual check and evaluation were made on appearances of the shaped product 41, notably those of end parts of bosses 43 and a rib 45.

Figure 3:
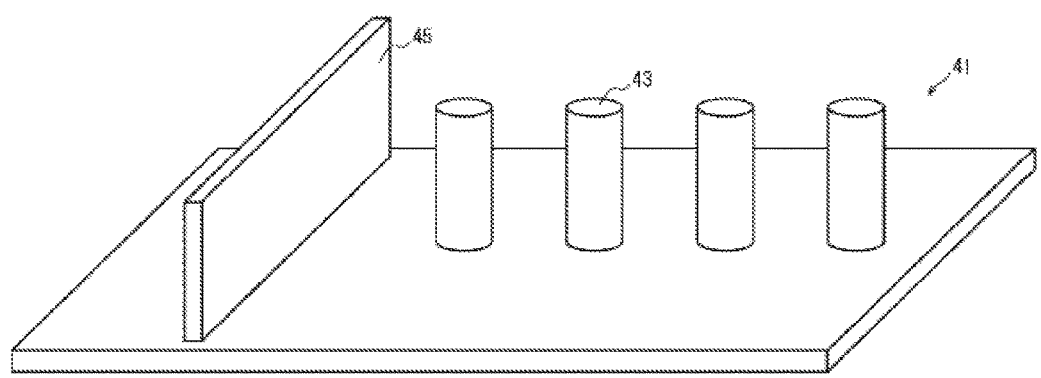
FIG. 3 is a diagrammatic view showing an example of a shaped product obtained by the use of a molding material.

For the evaluation purpose, the plate-shaped molding material 39 was heated, placed in a flat portion of a mold set at a temperature of 150° C. at a charging rate of 80%, and subjected to cold press for 60 seconds under a pressure of 5 MPa, thereby providing a shaped product 41 shown in FIG. 3. The filling capability of the molding material 39 was evaluated from the filling conditions of the thermoplastic resin in the bosses 43 and the rib 45. The index of evaluation is as follows.
 A (perfect): Both the boss and the rib were formed down to their corners in good conditions.
 B (excellent): Both of boss and rib shapes were formed, but have slight chipping in corner portions thereof.
 C (very good): Either of boss and rib shapes was formed without any problems, but forming of the other shape was more or less insufficient.
 D (good): Both of boss forming and rib forming were more or less insufficient.
 E (passed): Both of the boss and rib shapes formed were at a quality level comparable to about half the perfect quality
 F (less): Either of the boss and rib shapes formed was at a quality level comparable to about half the perfect quality, and the other shape formed was almost imperfect.
 G (bad): Both boss forming and rib forming were imperfect in shape.
3. Evaluation of Similarity of Interlayer Shear Strength A test specimen was cut from a horizontal portion of a thin shaped product by means of a jet of water, and subjected to measurement with a bending test machine, Shimadzu Universal Test Machine AGS-X 5KN made by Shimadzu Corporation. Herein, the inter-fulcrum distance and the test speed were adjusted to 15 mm and 2 mm, respectively, and the interlayer shear strength is determined using the following expression and described as a relative value, with Comparative Example 2 being taken as 100.

$\tau=(3P)/(4h(t^2))$

P: interlayer shearing load (N)
h: width of test specimen (mm)
t: plate-thickness of test specimen (mm)
[Matters Common Among Examples and Comparative Examples]

The carbon fibers and the thermoplastic resin used in Examples and Comparative Examples are those shown below.
 PAN base carbon fibers
 Polyamide 6 (PA6) (melting temperature: 225° C., decomposition temperature (in the air): 300° C.)

Example 1

Process 1

As to carbon fiber, Carbon Fiber TENAX (trade mark) STS40-24KS (fiber diameter: 7 μm, fiber width: 10 mm, tensile strength: 400 MPa), a product of TOHO TENAX Co., Ltd., was adopted, and used in a condition of being widened to have a width of 20 mm.

The following Process 1 can be carried out using an apparatus similar to the apparatus used for the precursor production process illustrated in FIG. 1. Accordingly, FIG. 1 can be consulted, and an explanation of Process 1 is made using FIG. 1.

A rotary cutter was used as a cutting device 3. And it was configured to have a 12-mm spacing between blades 15. As an opening device 5, a tube 21 with small holes was prepared, and thereto compressed air was fed. At this time, the speed of air from the small holes was 60 m/sec.

This tube 21 was placed directly underneath the rotary cutter, and a tapered tube 37 was further welded to the bottom of the tube 21. A thermoplastic resin was fed onto the lateral face of the tapered tube 37 from a powder feeding device 35. As the thermoplastic resin, Nylon 6 Resin A1030, a product of Unitika Limited, was used in the form of powder obtained by freeze-pulverizing and further sizing with a 20 mesh and subsequently a 30 mesh. The average particle size of this powder was about 1 mm.

Then, a support 31 movable in a plane direction and breathable was provided under the outlet of the tapered tube 37, and subjected to suction from the rear side thereof by means of a blower. By having brought this apparatus into operation, a precursor having a carbon fiber areal weight of 1,441 g/m² and a nylon resin areal weight of 1,704 g/m² was obtained. Meanwhile, this precursor was prepared for resin powder (P) use, and different from a precursor of the molding material illustrated in FIG. 1.

The thus prepared precursor was heated for 5 minutes under a pressure of 2.0 MPa by the use of a press device heated at 260° C., and thereby a composite material having a thickness t of 2.3 mm was obtained. The composite material obtained herein was finely pulverized with a large low-speed plastic crusher, thereby giving a granular material (R).

The thus obtained granular material (R) and the thermoplastic resin (polyamide 6) were mixed together in a weight ratio of 100:217, charged into a twin-screw extruder TEM26S2 made by TOSHIBA MACHINE CO., LTD., and melt-kneaded under conditions that the cylinder temperature was 280° C. and the revs of the screws were 100 rpm, thereby producing resin pellets having a carbon fiber volume fraction Vf of 9.7%. These pellets were further pulverized into resin powder (P) by means of a pulverizer. The average particle size of the resin powder (P) thus obtained was about 1 mm, and the particles were irregular in shape.

Characteristics of the carbon fibers (A) included in the resin powder (P) were measured, and thereby it was found that the fiber-length distribution was in a rage of 0.01 mm to 1.1 mm, the number-average fiber length $Ln_A$ was 0.11 mm and the weight-average fiber length $Lw_A$ was 0.22 mm ($Lw_A/Ln_A=2$).

Processes 2 to 5

Carbon Fiber TENAX (trade mark) STS40-24KS (fiber diameter: 7 μm, fiber width: 10 mm), a product of TOHO TENAX Co., Ltd., was widened to have a width of 20 mm, and adopted as carbon fibers (B). A rotary cutter was used as a cutting device 3 for carbon fibers (B). The rotary cutter was configured to have 20 mm-pitch blades 15, and thereby the carbon fibers were cut into a fiber length of 20 mm.

As an opening device 5, a tube 21 having a dual structure was made by welding nipples different in diameter and made of SUS304. Small holes were bored in the inner tube, and compressed air was fed into an interstice between the inner tube and the outer tube by means of a compressor 23. At this time, the speed of air from the small holes was 450 msec. This tube 21 was placed directly underneath the rotary cutter, and a tapered tube 37 was further welded to the bottom of the tube 21. The resin powder (P) obtained in the Process 1 was fed onto the lateral face of the tapered tube 37 from a powder feeding device 35.

Then, a support 31 movable in a plane direction and breathable was provided under the outlet of the tapered tube 37, and subjected to suction from the rear side thereof by means of a blower. By having brought this apparatus into operation, the carbon fibers (B) and the resin powder (P) were mixed together so that the weight proportion of all carbon fibers in a precursor 33 was adjusted to 45.8% (areal weight of carbon fibers in their entirety: 1,880 g/m², nylon resin areal weight: 2,223 g/m²) and the weight ratio between the carbon fibers (A) and the carbon fibers (B) was adjusted to 10:90. Thus, the precursor 33 was obtained.

Fiber lengths of carbon fibers incorporated into the thus obtained precursor 33 were measured, and thereby it was found that a weight ratio between the carbon fibers (A) having fiber lengths in a range of 0.01 mm to shorter than 3 mm and the carbon fibers (B) having fiber lengths in a range of 3 mm to shorter than 100 mm was 10:90 and the carbon fibers (B) had the constant fiber length of 20 mm.

Because the rotary cutter having a fixed length of blade pitch was used for the cut process of carbon fibers (B), it was able to give the same fiber length to the carbon fibers (B) incorporated in the precursor 33. Consequently, both the weight-average fiber length $Lw_B$ and the number-average fiber length $Ln_B$ were 20 mm and $Lw_B/Ln_B$ was 1.0.

When the thus obtained precursor 33 was examined for the proportion of the carbon fiber bundles (B1) and the average fiber number ($N_B$), it was found that the critical number of single fiber defined by the expression (1) was 86, the proportion of carbon fiber bundles (B1) to the total carbon fibers (B) was 85 vol % and the average fiber number ($N_B$) in the carbon fiber bundles (B1) was 750.

The thus obtained precursor 33 was heated for 20 minutes under a pressure of 3 MPa by the use of a press device heated at 260° C., and thereby a plate-shaped molding material having a plate thickness of 3 mm (see FIG. 4) was obtained.

When an ultrasonic flaw detection test was conducted on the thus obtained molding material, neither un-impregnated portions nor voids were ascertained.

When measurements of tensile moduli in 0° and 90° directions were made on the plate-shaped molding material obtained, it was found that the ratio between the moduli, Eδ, of the molding material was 1.03 and there was almost no difference in fiber orientation. In other words, it was able to obtain the material ensuring isotropy in two-dimensional directions.

Further, the molding material 39 was heated for 1 hour in a 500° C. furnace to remove the thermoplastic resin therefrom. Then, the resulting material was examined for the ratio between the carbon fibers (A) and the carbon fibers (B), the proportion of the carbon fiber bundles (B1), and the average fiber number ($N_B$) in the carbon fiber bundles (B1). No differences were detected between the results obtained herein and the results of measurements made on the precursor 33.

The results of the molding material 39 are shown in Table 1. Additionally, mechanical properties are shown as relative ones with respect to those in Comparative Example 1.

Further, the plate-shaped molding material 39 was heated up to 300° C. by means of an IR oven made by NGK Kilntec K.K., placed in a flat portion of a mold set at a temperature of 120° C. at a charging rate of 80%, and subjected to 60-second cold press under a pressure of 5 MPa, thereby providing a shaped product 41 having bosses 43 and a rib 45 as shown in FIG. 3.

Example 2

A molding material was prepared in the same manner as in Example 1, except that the weight ratio between the carbon fibers (A) and the carbon fibers (B) was changed to 20:80. Results obtained are shown in Table 1.

Example 3

A molding material was prepared in the same manner as in Example 1, except that the weight ratio between the carbon fibers (A) and the carbon fibers (B) was changed to 30:70. Results obtained are shown in Table 1.

Example 4

A molding material was prepared in the same manner as in Example 1, except that the weight ratio between the carbon fibers (A) and the carbon fibers (B) was changed to 40:60. Results obtained are shown in Table 1.

Example 5

A molding material was prepared in the same manner as in Example 2, except that the step of obtaining the resin powder (P) was omitted without melt-kneading the granular material (R) obtained during the Process 1 and the granular material (R) was used in place of the resin powder (P) during the Process 2 and beyond.

When characteristics of the carbon fibers (A) incorporated into the granular material (R) were measured, it was found that the fiber-length distribution was in a range of 0.01 mm to 2.3 mm, the number-average fiber length $Ln_A$ was 0.22 mm and the weight-average fiber length $Lw_A$ was 0.55 mm ($Lw_A/Ln_A$=2.5). Results obtained are shown in Table 1.

Example 6

A molding material was prepared in the same manner as in Example 5, except that the weight ratio between the carbon fibers (A) and the carbon fibers (B) was changed to 50:50. Results obtained are shown in Table 1.

Comparative Example 1

A molding material was prepared in the same manner as in Example 1, except that the ratio between contents of the carbon fibers (A) and the carbon fibers (B) was adjusted to become 100:0 without using the carbon fibers (B).

At this time, the content of the carbon fibers (A) was adjusted so that the total content of carbon fibers in the molding material became the same as in Example 1.

The characteristics of the carbon fibers (A) and those of the plate-shaped molding material obtained were evaluated by the same methods as adopted in Example 1. Results obtained are shown in Table 1.

Comparative Example 2

A precursor containing no carbon fibers (A) was prepared by omitting the Process 1 in Example 1 and carrying out only the Processes 2 to 5. At this time, the content of the carbon fibers (B) was adjusted so that the total content of carbon fibers in a molding material became the same as in Example 1.

When a weight ratio between the carbon fibers (A) having their fiber lengths in a range of 0.01 mm to shorter than 3 mm and the carbon fibers (B) having their fiber lengths in a range of 3 mm to shorter than 100 mm was analyzed by measuring fiber lengths of carbon fibers incorporated into the precursor obtained, it was found to be 0:100, and fiber lengths of the carbon fibers (B) were a constant length of 20 mm. Both the weight-average fiber length $Lw_B$ and the number-average fiber length $Ln_B$ were the same length of 20 mm, and $Lw_B/Ln_B$ was 1.0.

Where the precursor obtained was concerned, the critical number of single fiber number defined by the expression (1) was found to be 86 when the proportion of carbon fiber bundles (B1) and the average fiber number (N) were examined, and as to the carbon fiber bundles (B1), it was found that the proportion of the carbon fiber bundles (B1) to all carbon fibers constituting a mat was 86 vol % and the average fiber number in each of the carbon fiber bundles (B1) was 1,500.

The precursor obtained was pressed in the same manner as in Example 1 and thereby formed into a plate-shaped molding material having a plate thickness of 3.0 mm. Fiber characteristics of the carbon fibers (B) in the precursor and evaluation results of the molding material are shown in Table 1.

Comparative Example 3

A molding material was prepared in the same manner as in Comparative Example 2, except that the fiber volume proportion of all the carbon fibers was adjusted to become 28%. Results obtained are shown in Table 1. From the viewpoint of the fiber volume proportion of the carbon fibers (B) alone, Comparative Example 3 was in consistent with Example 2.

Comparative Example 4

A molding material was prepared in the same manner as in Comparative Example 2, except that the fiber volume proportion of all the carbon fibers was adjusted to become 40%. Results obtained are shown in Table 1.

Comparative Example 5

A molding material was prepared in the same manner as in Comparative Example 2, except that the proportion of the carbon fiber bundles (B1) and the average fiber number $N_B$ in the fiber bundles (B1) were adjusted to become those shown in Table 1. Results obtained are shown in Table 1.

Example 7

A molding material was prepared in the same manner as in Example 2, except that the $Lw_A/Ln_A$ as to the carbon fibers (A) was adjusted to become the value shown in Table 2. Results obtained are shown in Table 2.

Example 8

A molding material was prepared in the same manner as in Example 2, except that the $Lw_A/Ln_A$ as to the carbon fibers (A) was adjusted to become the value shown in Table 2. Results obtained are shown in Table 2.

Example 9

A molding material was prepared in the same manner as in Example 2, except that the proportion of the carbon fiber bundles (B1) and the average fiber number $N_B$ were adjusted to become the values shown in Table 2, respectively. Results obtained are shown in Table 2.

Example 10

A molding material was prepared in the same manner as in Example 2, except that the proportion of the carbon fiber bundles (B1) and the average fiber number $N_B$ in the carbon fiber bundles (B1) were adjusted to become the values shown in Table 2, respectively. Results obtained are shown in Table 2.

Example 11

A molding material was prepared in the same manner as in Example 2, except that the proportion of the carbon fiber bundles (B1) and the average fiber number $N_B$ in the carbon fiber bundles (B1) were adjusted to become the values shown in Table 2, respectively. Results obtained are shown in Table 2.

Example 12

A molding material was prepared in the same manner as in Example 2, except that the proportion of the carbon fiber bundles (B1) and the average fiber number $N_B$ were adjusted to become the values shown in Table 2, respectively. Results obtained are shown in Table 2.

Example 13

A molding material was prepared in the same manner as in Example 2, except that, where the carbon fiber bundles (B) were concerned, the $Lw_B$ and the $Ln_B$ were adjusted to become the values shown in Table 2, respectively. Results obtained are shown in Table 2.

Example 14

A molding material was prepared in the same manner as in Example 2, except that, where the carbon fiber bundles (B) were concerned, the $Lw_B$ and the $Ln_B$ were adjusted to become the values shown in Table 2, respectively. Results obtained are shown in Table 2.

Example 15

A molding material was prepared in the same manner as in Example 2, except that, where the carbon fiber bundles (B) were concerned, the $Lw_B$, the $Ln_B$, the proportion of the carbon fiber bundles (B1) and the average fiber number $N_B$ in the carbon fiber bundles (B1) were adjusted to become the values shown in Table 2, respectively. Results obtained are shown in Table 2.

Example 16

A molding material was prepared in the same manner as in Example 2, except that, where the carbon fiber bundles (B) were concerned, the $Lw_B$, the $Ln_B$, the proportion of the carbon fiber bundles (B1) and the average fiber number $N_B$ were adjusted to become the values shown in Table 2, respectively. Results obtained are shown in Table 2.

Example 17

A molding material was prepared in the same manner as in Example 2, except that, where the carbon fiber bundles (B) were concerned, the $Lw_B$ and the $Ln_B$ were adjusted by adjustment in the cut length so that they became the values shown in Table 2, respectively. Results obtained are shown in Table 2.

Example 18

A molding material was prepared in the same manner as in Example 2, except that the weight ratio between the carbon fibers (A) and the carbon fibers (B) was adjusted to become the value shown in Table 2. Results obtained are shown in Table 2.

Example 19

A molding material was prepared in the same manner as in Example 2, except that the weight ratio between the carbon fibers (A) and the carbon fibers (B) was adjusted to become the value shown in Table 2. Results obtained are shown in Table 2.

Comparative Example 6

A molding material was prepared in the same manner as in Example 2, except that, where the carbon fibers (A) were concerned, the $Lw_A$ and the $Ln_A$ were adjusted to become the values shown in Table 3, respectively. Results obtained are shown in Table 3.

Comparative Example 7

A molding material was prepared in the same manner as in Example 2, except that, where the carbon fibers (A) were concerned, the $Lw_A$ and the $Ln_A$ were adjusted to become the values shown in Table 3, respectively. Results obtained are shown in Table 3.

Comparative Example 8

A molding material was prepared in the same manner as in Example 2, except that the $Lw_A$ and $Ln_A$ as to the carbon fibers (A), the proportion of the carbon fiber bundles (B1) and the average fiber number $N_B$ in the carbon fiber bundles (B1) were adjusted to become the values shown in Table 3, respectively. Results obtained are shown in Table 3.

Example 20

A molding material was prepared in the same manner as in Example 2, except that the proportion of the carbon fiber bundles (B1) and the average fiber number $N_B$ in the carbon fiber bundles (B1) were adjusted to become the values shown in Table 3, respectively. Results obtained are shown in Table 3.

Comparative Example 9

A molding material was prepared in the same manner as in Example 2, except that the $Lw_A$, the $Ln_A$, the proportion of the carbon fiber bundles (B1) and the average fiber number $N_B$ were adjusted to become the values shown in Table 3, respectively. Results obtained are shown in Table 3.

Comparative Example 10

A molding material was prepared in the same manner as in Example 2, except that the $Lw_A$, the $Ln_A$, the proportion of the carbon fiber bundles (B1) and the average fiber number $N_B$ were adjusted to become the values shown in Table 3, respectively. Results obtained are shown in Table 3.

Comparative Example 11

A molding material was prepared in the same manner as in Example 2, except that glass fibers (E-Glass, a product of Nitto Bosch Co., Ltd.) were used in place of the carbon fibers and they were adjusted to be shown in Table 3. Results obtained are shown in Table 3.

Comparative Example 12

A molding material was prepared in the same manner as in Example 2, except that glass fibers (E-Glass, a product of Nitto Bosch Co., Ltd.) were used in place of the carbon fibers and they were adjusted to be shown in Table 3. Results obtained are shown in Table 3.

[Theory of Additivity Law and Calculation for Verification]

With the bending strength determined in Comparative Example 1 and that in Comparative Example 2 being symbolized by Sa and Sb, respectively, and the weight proportion of the carbon fibers (A) to all the fibers in each Example being symbolized by q, qSa+(1−q)Sb was calculated. Results obtained are shown in Table 4 and those in graphical form are shown in FIG. 7.

TABLE 1

| | | | Example 1 | Example 2 | Example 3 | Example 4 | Example 5 | Example 6 |
|---|---|---|---|---|---|---|---|---|
| Fiber | | Kind | Carbon fiber | Carbon fiber | Carbon fiber | Carbon fiber | Carbon fiber | Carbon fiber |
| | Carbon Fiber (A) | Number-average fiber length $Ln_A$: mm | 0.11 | 0.11 | 0.11 | 0.11 | 0.22 | 0.22 |
| | | Weight-average fiber length $Lw_A$: mm | 0.22 | 0.22 | 0.22 | 0.22 | 0.55 | 0.55 |
| | | $Lw_A/Ln_A$ | 2.0 | 2.0 | 2.0 | 2.0 | 2.5 | 2.5 |
| | | Condition of three-dimensional randomness | A (Excellent) | A (Excellent) | A (Excellent) | A (Excellent) | B (Good) | B (Good) |
| | | Proportion of carbon fiber bundles (A1) | 5 Vol % | 5 Vol % | 5 Vol % | 5 Vol % | 50 Vol % | 50 Vol % |
| | | Average fiber number $N_A$ | 100 | 100 | 100 | 100 | 400 | 400 |
| | | Area proportion of carbon fiber bundles (A1) | 5% (perfect) | 5% (perfect) | 5% (perfect) | 5% (perfect) | 70% (good) | 70% (good) |
| | Carbon Fiber (B) | Number-average fiber length $Ln_B$: mm | 20 | 20 | 20 | 20 | 20 | 20 |
| | | Weight-average fiber length $Lw_B$: mm | 20 | 20 | 20 | 20 | 20 | 20 |
| | | Condition of two-dimensional randomness | A (good) | A (good) | A (good) | A (good) | A (good) | A (good) |
| | | Proportion of carbon fiber bundles (B1) | 85 Vol % | 85 Vol % | 85 Vol % | 85 Vol % | 85 Vol % | 85 Vol % |
| | | Average fiber number $N_B$ | 750 | 750 | 750 | 750 | 750 | 750 |
| | | $Lw_B/Ln_B$ | 1.0 | 1.0 | 1.0 | 1.0 | 1.0 | 1.0 |
| Molding Material | Weight ratio between carbon fibers (A) and carbon fibers (B) | | 10:90 | 20:80 | 30:70 | 40:60 | 20:80 | 50:50 |
| | Thermoplastic resin | | PA6 | PA6 | PA6 | PA6 | PA6 | PA6 |
| | Fiber volume fraction Vf;: % | | 35 | 35 | 35 | 35 | 35 | 35 |
| Shaped product | Physical Property | Bending strength (relative value) | 92 | 91 | 85 | 79 | 92 | 62 |
| | Moldability | Capability of filling | D (good) | B (excellent) | B (excellent) | A (perfect) | B (excellent) | A (perfect) |
| | Evaluation of Similarity of interlayer shear strength (relative value) | | 98 | 95 | 90 | 80 | 95 | 60 |

| | | | Compar. Example 1 | Compar. Example 2 | Compar. Example 3 | Compar. Example 4 | Compar. Example 5 |
|---|---|---|---|---|---|---|---|
| Fiber | | Kind | Carbon fiber | Carbon fiber | Carbon fiber | Carbon fiber | Carbon fiber |
| | Carbon Fiber (A) | Number-average fiber length $Ln_A$: mm | 0.11 | — | — | — | — |
| | | Weight-average fiber length $Lw_A$: mm | 0.22 | — | — | — | — |
| | | $Lw_A/Ln_A$ | 2.0 | — | — | — | — |
| | | Condition of three-dimensional randomness | A (Excellent) | — | — | — | — |
| | | Proportion of carbon fiber bundles (A1) | 50 Vol % | — | — | — | — |
| | | Average fiber number $N_A$ | 400 | — | — | — | — |
| | | Area proportion of carbon fiber bundles (A1) | 5% (perfect) | — | — | — | — |
| | Carbon Fiber (B) | Number-average fiber length $Ln_B$: mm | — | 20 | 20 | 20 | 20 |
| | | Weight-average fiber length $Lw_B$: mm | — | 20 | 20 | 20 | 20 |
| | | Condition of two-dimensional randomness | — | A (good) | A (good) | A (good) | A (good) |
| | | Proportion of carbon fiber bundles (B1) | — | 85 Vol % | 85 Vol % | 85 Vol % | 5 Vol % |
| | | Average fiber number $N_B$ | — | 750 | 750 | 750 | 100 |
| | | $Lw_B/Ln_B$ | — | 1.0 | 1.0 | 1.0 | 1.0 |

TABLE 1-continued

| | | | | | | | |
|---|---|---|---|---|---|---|---|
| Molding Material | | Weight ratio between carbon fibers (A) and carbon fibers (B) | 100:0 | 0:100 | 0:100 | 0:100 | 0:100 |
| | | Thermoplastic resin | PA6 | PA6 | PA6 | PA6 | PA6 |
| | | Fiber volume fraction Vf;: % | 35 | 35 | 28 | 40 | 35 |
| Shaped product | Physical Property | Bending strength (relative value) | 45 | 100 | 83 | 104 | 105 |
| | Moldability | Capability of filling | A (perfect) | D (good) | B (excellent) | G (bad) | G (bad) |
| | | Evaluation of Similarity of interlayer shear strength (relative value) | — | 100 | 85 | 100 | 105 |

TABLE 2

| | | | Example 7 | Example 8 | Example 9 | Example 10 | Example 11 | Example 12 | Example 13 |
|---|---|---|---|---|---|---|---|---|---|
| Fiber | | Kind | Carbon fiber | Carbon fiber | Carbon fiber | Carbon fiber | Carbon fiber | Carbon fiber | Carbon fiber |
| | Carbon Fiber (A) | Number-average fiber length $Ln_A$: mm | 0.11 | 0.11 | 0.11 | 0.11 | 0.11 | 0.11 | 0.11 |
| | | Weight-average fiber length $Lw_A$: mm | 0.16 | 0.28 | 0.22 | 0.22 | 0.22 | 0.22 | 0.22 |
| | | $Lw_A/Ln_A$ | 1.5 | 2.5 | 2.0 | 2.0 | 2.0 | 2.0 | 2.0 |
| | | Condition of three-dimensional randomness | A Excellent | A Excellent | A Excellent | A Excellent | A Excellent | A Excellent | A Excellent |
| | | Proportion of carbon fiber bundles (A1) | 5 Vol % | 5 Vol % | 5 Vol % | 5 Vol % | 5 Vol % | 5 Vol % | 5 Vol % |
| | | Average fiber number $N_A$ | 100 | 100 | 100 | 100 | 100 | 100 | 100 |
| | | Area proportion of carbon fiber bundles (A1) | 5% (perfect) | 5% (perfect) | 5% (perfect) | 5% (perfect) | 5% (perfect) | 5% (perfect) | 5% (perfect) |
| | Carbon Fiber (B) | Number-average fiber length $Ln_B$: mm | 20 | 20 | 20 | 20 | 20 | 20 | 30 |
| | | Weight-average fiber length $Lw_B$: mm | 20 | 20 | 20 | 20 | 20 | 20 | 30 |
| | | Condition of two-dimensional randomness | A (good) | A (good) | A (good) | A (good) | A (good) | A (good) | A (good) |
| | | Proportion of carbon fiber bundles (B1) | 85 Vol % | 85 Vol % | 40 Vol % | 20 Vol % | 10 Vol % | 5 Vol % | 85 Vol % |
| | | Average fiber number $N_B$ | 750 | 750 | 400 | 200 | 150 | 100 | 750 |
| | | $Lw_B/Ln_B$ | 1.0 | 1.0 | 1.0 | 1.0 | 1.0 | 1.0 | 1.0 |
| Molding Material | | Weight ratio between carbon fibers (A) and carbon fibers (B) | 20:80 | 20:80 | 20:80 | 20:80 | 20:80 | 20:80 | 20:80 |
| | | Thermoplastic resin | PA6 | PA6 | PA6 | PA6 | PA6 | PA6 | PA6 |
| | | Fiber volume fraction Vf;: % | 35 | 35 | 35 | 35 | 35 | 35 | 35 |
| Shaped product | Physical Property | Bending strength (relative value) | 91 | 91 | 99 | 103 | 103 | 103 | 91 |
| | Moldability | Capability of filling | B excellent | B excellent | D good | E passed | E passed | E passed | C very good |
| | | Evaluation of Similarity of interlayer shear strength (relative value) | 95 | 95 | 95 | 100 | 105 | 110 | 95 |

| | | | Example 14 | Example 15 | Example 16 | Example 17 | Example 18 | Example 19 |
|---|---|---|---|---|---|---|---|---|
| Fiber | | Kind | Carbon fiber | Carbon fiber | Carbon fiber | Carbon fiber | Carbon fiber | Carbon fiber |
| | Carbon Fiber (A) | Number-average fiber length $Ln_A$: mm | 0.11 | 0.11 | 0.11 | 0.11 | 0.11 | 0.11 |
| | | Weight-average fiber length $Lw_A$: mm | 0.22 | 0.22 | 0.22 | 0.22 | 0.22 | 0.22 |
| | | $Lw_A/Ln_A$ | 2.0 | 2.0 | 2.0 | 2.0 | 2.0 | 2.0 |
| | | Condition of three-dimensional randomness | A Excellent | A Excellent | A Excellent | A Excellent | A Excellent | A Excellent |
| | | Proportion of carbon fiber bundles (A1) | 5 Vol % | 5 Vol % | 5 Vol % | 5 Vol % | 5 Vol % | 5 Vol % |
| | | Average fiber number $N_A$ | 100 | 100 | 100 | 100 | 100 | 100 |
| | | Area proportion of carbon fiber bundles (A1) | 5% (perfect) | 5% (perfect) | 5% (perfect) | 5% (perfect) | 5% (perfect) | 5% (perfect) |
| | Carbon Fiber (B) | Number-average fiber length $Ln_B$: mm | 15 | 10 | 5 | 20 | 20 | 20 |
| | | Weight-average fiber length $Lw_B$: mm | 15 | 10 | 5 | 22 | 20 | 20 |
| | | Condition of two-dimensional randomness | A (good) | A (good) | A (good) | A (good) | A (good) | A (good) |
| | | Proportion of carbon fiber bundles (B1) | 85 Vol % | 5 Vol % | 5 Vol % | 85 Vol % | 85 Vol % | 85 Vol % |
| | | Average fiber number $N_B$ | 750 | 100 | 100 | 750 | 750 | 750 |
| | | $Lw_B/Ln_B$ | 1.0 | 1.0 | 1.0 | 1.1 | 1.0 | 1.0 |
| Molding Material | | Weight ratio between carbon fibers (A) and carbon fibers (B) | 20:80 | 20:80 | 20:80 | 20:80 | 70:30 | 90:10 |
| | | Thermoplastic resin | PA6 | PA6 | PA6 | PA6 | PA6 | PA6 |
| | | Fiber volume fraction Vf;: % | 35 | 35 | 35 | 35 | 35 | 35 |
| Shaped product | Physical Property | Bending strength (relative value) | 91 | 99 | 100 | 91 | 58 | 48 |
| | Moldability | Capability of filling | B excellent | D good | D good | B excellent | A perfect | A perfect |
| | | Evaluation of Similarity of interlayer shear strength (relative value) | 95 | 110 | 110 | 95 | 80 | 50 |

TABLE 3

|  |  |  | Comparative Example 6 | Comparative Example 7 | Comparative Example 8 | Example 20 |
|---|---|---|---|---|---|---|
| Fiber |  | Kind | Carbon fiber | Carbon fiber | Carbon fiber | Carbon fiber |
|  | Carbon Fiber (A) | Number-average fiber length $Ln_A$: mm | 3 | 1 | 2 | 0.11 |
|  |  | Weight-average fiber length $Lw_A$: mm | 3 | 1 | 2 | 0.22 |
|  |  | $Lw_A/Ln_A$ | 1.0 | 1.0 | 1.0 | 2.0 |
|  |  | Condition of three-dimensional randomness | C (bad) Two-dimensionally Random | C (bad) Two-dimensionally Random | C (bad) Two-dimensionally Random | A (excellent) |
|  |  | Proportion of carbon fiber bundles (A1) | 20 Vol % | 20 Vol % | 20 Vol % | 5 Vol % |
|  |  | Average fiber number $N_A$ | 200 | 200 | 200 | 100 |
|  |  | Area proportion of carbon fiber bundles (A1) | Fairly high (not measured) | Fairly high (not measured) | 100% (good) | 5% (perfect) |
|  | Carbon Fiber (B) | Number-average fiber length $Ln_B$: mm | 20 | 20 | 20 | 20 |
|  |  | Weight-average fiber length $Lw_B$: mm | 20 | 20 | 20 | 20 |
|  |  | Condition of two-dimensional randomness | A (good) | A (good) | A (good) | A (good) |
|  |  | Proportion of carbon fiber bundles (B1) | 85 Vol % | 85 Vol % | 100 Vol % | 100 Vol % |
|  |  | Average fiber number $N_B$ | 750 | 750 | 1,800 | 24,000 |
|  |  | $Lw_B/Ln_B$ | 1.0 | 1.0 | 1.0 | 1.0 |
| Molding Material |  | Weight ratio between carbon fibers (A) and carbon fibers (B) | 20:80 | 20:80 | 20:80 | 20:80 |
|  |  | Thermoplastic resin | PA6 | PA6 | PA6 | PA6 |
|  |  | Fiber volume fraction $Vf$: % | 35 | 35 | 35 | 35 |
| Molded Body | Physical Property | Bending strength (relative value) | 95 | 93 | 88 | 82 |
|  | Moldability | Capability of filling | G (bad) | D (good) | F (less) | A (perfect) |
|  |  | Evaluation of Similarity of interlayer shear strength (relative value) | 80 | 80 | 90 | 85 |

|  |  |  | Comparative Example 9 | Comparative Example 10 | Comparative Example 11 | Comparative Example 12 |
|---|---|---|---|---|---|---|
| Fiber |  | Kind | Carbon fiber | Carbon fiber | Glass fiber | Glass fiber |
|  | Carbon Fiber (A) | Number-average fiber length $Ln_A$: mm | 1 | 1 | 3 | 0.8 |
|  |  | Weight-average fiber length $Lw_A$: mm | 1 | 1 | 3 | 1.5 |
|  |  | $Lw_A/Ln_A$ | 1.0 | 1.0 | 1.0 | 1.9 |
|  |  | Condition of three-dimensional randomness | A (excellent) | A (excellent) | A (excellent) | A (excellent) |
|  |  | Proportion of carbon fiber bundles (A1) | 5 Vol % | 5 Vol % | 100 Vol % | 5 Vol % |
|  |  | Average fiber number $N_A$ | 100 | 100 | 60 | 60 |
|  |  | Area proportion of carbon fiber bundles (A1) | 5% (perfect) | 5% (perfect) | 100% (good) | 5% (perfect) |
|  | Carbon Fiber (B) | Number-average fiber length $Ln_B$: mm | 20 | 20 | 20 | 20 |
|  |  | Weight-average fiber length $Lw_B$: mm | 20 | 20 | 20 | 20 |
|  |  | Condition of two-dimensional randomness | A (good) | A (good) | A (good) | A (good) |
|  |  | Proportion of carbon fiber bundles (B1) | 100 Vol % | 5 Vol % | 100 Vol % | 5 Vol % |
|  |  | Average fiber number $N_B$ | 24,000 | 100 | 3,000 | 60 |
|  |  | $Lw_B/Ln_B$ | 1.0 | 1.0 | 1.0 | 1.0 |
| Molding Material |  | Weight ratio between carbon fibers (A) and carbon fibers (B) | 20:80 | 20:80 | 20:80 | 20:80 |
|  |  | Thermoplastic resin | PA6 | PA6 | PA6 | PA6 |
|  |  | Fiber volume fraction $Vf$: % | 35 | 35 | 50 | 50 |
| Molded Body | Physical Property | Bending strength (relative value) | 84 | 103 | 39 | 47 |
|  | Moldability | Capability of filling | B (excellent) | F (less) | A (perfect) | D (good) |
|  |  | Evaluation of Similarity of interlayer shear strength (relative value) | 85 | 110 | — | — |

TABLE 4

|  | Comparative Example 2 | Example 1 | Example 2 | Example 3 | Example 4 | Example 5 | Comparative Example 1 |
|---|---|---|---|---|---|---|---|
| Weight proportion of carbon fiber (A) | 0% | 10% | 20% | 30% | 40% | 20% | 100% |
| Number-average fiber length $Ln_A$: mm | — | 0.11 | 0.11 | 0.11 | 0.11 | 0.22 | 0.11 |
| Area proportion of fiber bundles | — | 5% (perfect) | 5% (perfect) | 5% (perfect) | 5% (perfect) | 70% (good) | 5% (perfect) |
| Volume fraction Vf of carbon fibers (A) | 0 | 3.5 | 7.0 | 10.5 | 14.0 | 7.0 | 100.0 |
| Volume fraction Vf of carbon fibers (B) | 35% | 31.5% | 28.0% | 24.5% | 21.0% | 28.0% | 0.0% |
| Volume proportion of carbon fiber bundles (B1) | 85% | 85% | 85% | 85% | 85% | 85% | — |

TABLE 4-continued

|  | Comparative Example 2 | Example 1 | Example 2 | Example 3 | Example 4 | Example 5 | Comparative Example 1 |
|---|---|---|---|---|---|---|---|
| Volume proportion of thermoplastic resin | 65% | 65% | 65% | 65% | 65% | 65% | 65% |
| Theoretical value based on theory of additivity law (relative value) | 100 | 93 | 87 | 82 | 77 | 102 | 87 |
| Actually measured value (relative value) | 100 | 96 | 91 | 85 | 79 | 92 | 40 |
| Rate of exceeding theory of additivity law | 100.0% | 103.2% | 104.6% | 103.7% | 102.6% | 90.2% | 46.0% |

INDUSTRIAL APPLICABILITY

The present molding material can be used for a wide variety of structural members, such as inner plates, outer plates and other structural members of vehicles, and as preforms e.g. for flames and housings of various electrical appliances and machines. While the invention has been illustrated above in detail and by reference to specific embodiments, it will be apparent to persons skilled in the art that various changes and modifications can be made without departing from the spirit and scope of the invention.

While the invention has been illustrated above in detail and by reference to specific embodiments, it will be apparent to persons skilled in the art that various changes and modifications can be made to the invention without departing from the spirit and scope of the invention.

The present application is based on Japanese Patent Application No. 2014-026968, filed on Feb. 14, 2014, the contents of which are incorporated herein by reference.

DESCRIPTION OF REFERENCE NUMERALS AND SINGS

1 Carbon fiber
3 Cutting device
5 Opening device
7 Spraying device
12 Pinch roller
13 Rubber roller
14 Rotary cutter
15 Blade
16 Carbon fiber after cutting
17 Blade parallel to fiber direction
21 Tube
23 Compressor
31 Support
33 Precursor for molding material
35 Powder feeding device
37 Tapered tube
39 Molding material
41 Shaped product
43 Boss
45 Rib
A Carbon fibers (A)
B Carbon fibers (B)
C Thermoplastic resin

The invention claimed is:

1. A plate-shaped carbon fiber reinforced molding material comprising a thermoplastic resin, carbon fibers (A) and carbon fibers (B), wherein: i) the carbon fibers (A) have fiber lengths ranging from 0.01 mm to less than 3 mm, ii) the carbon fibers (B) have fiber lengths ranging from 3 mm to less than 100 mm, iii) $1.3 < L_{WA}/L_{nA} < 3$ is satisfied where $L_{WA}$ and $L_{nA}$ are a weight-average fiber length and a number-average fiber length of the carbon fibers (A), respectively, and $1.0 < L_{WB}/L_{nB} < 1.2$ is satisfied where $L_{WB}$ and $L_{nB}$ are a weight-average fiber length and a number-average fiber length of the carbon fibers (B), respectively, iv) the carbon fibers (B) are two-dimensionally randomly oriented, v) a proportion of the weight of the carbon fibers (A) to a sum of the weights of the carbon fibers (A) and the carbon fibers (B) is from 5 weight % to 50 weight %, and vi) the carbon fibers (B) includes carbon fiber bundles (B1), wherein an average fiber number ($N_B$) in the carbon fiber bundles (B1) satisfies the following expression (2); $0.43 \times 10^4/D_B^2 < N_B < 6 \times 10^5/D_B^2$ (2) where $D_B$ is an average fiber diameter (μm) of the single carbon fibers (B).

2. The carbon fiber reinforced molding material according to claim 1,
wherein the carbon fibers (A) are three-dimensionally randomly oriented.

3. The carbon fiber reinforced molding material according to claim 1,
wherein:
1) the carbon fiber bundles (B1) are constituted by fibers of a critical number of single fiber or more, the critical number of single fiber being defined by the following expression (1), and the carbon fibers (B) further includes single fibers and fiber bundles constituted by fibers of less than the critical number of single fiber, and
2) a proportion of the carbon fiber bundles (B1) is from 5 vol % to less than 95 vol % with respect to a total volume of the carbon fibers (B) in the carbon fiber reinforced molding material;

$$\text{Critical number of single fiber} = 600/D_B \qquad (1)$$

where $D_B$ is an average fiber diameter (μm) of the single carbon fibers (B).

4. The carbon fiber reinforced molding material according to claim 1, wherein bending strength S is a value obtained by multiplying "qSa+(1−q)Sb" by a factor of 0.8 or greater where
Sa represents a bending strength of a molding material (A) consisting of the carbon fibers (A) and the thermoplastic resin,
Sb represents a bending strength of a molding material (B) consisting of the carbon fibers (B) and the thermoplastic resin, and
q represents a weight ratio of the carbon fibers (A) content to a total content of the carbon fibers (A) and the carbon fibers (B).

5. A shaped product formed by using the carbon fiber reinforced molding material according to claim 1,
wherein when a plate thickness in an area smallest in plate thickness of the shaped product is defined as a minimum plate thickness T (mm), (a) the number-average fiber length $L_{nA}$ of the carbon fibers (A) is shorter than T/2 (mm), and (b) the number-average fiber length $L_{nB}$ of the carbon fibers (B) is T (mm) or more.

6. The shaped product according to claim 5, wherein the minimum plate thickness T (mm) is 1 mm or more.

7. A shaped product formed by using the carbon fiber reinforced molding material according to claim 1, wherein a proportion of an area of carbon fiber bundles (A1) defined below to the area of a total carbon fibers (A) is from higher than 0% to 50% when a cross section of the shaped product is observed in a plate thickness direction, and the carbon fiber bundles (A1) belong to the carbon fibers (A) and are carbon fiber bundles in which the number of fibers is observed by at least $35/D_A$ where $D_A$ is an average fiber diameter (μm) of the carbon fibers (A).

* * * * *